United States Patent
Shaheen

(10) Patent No.: US 8,817,741 B2
(45) Date of Patent: Aug. 26, 2014

(54) METHOD AND APPARATUS FOR RESOURCE MANAGEMENT IN HANDOVER OPERATION

(75) Inventor: Kamel M. Shaheen, King of Prussia, PA (US)

(73) Assignee: Interdigital Technology Corporation, Wilmington, DE (US)

( * ) Notice: Subject to any disclaimer, the term of this patent is extended or adjusted under 35 U.S.C. 154(b) by 936 days.

(21) Appl. No.: 12/143,249

(22) Filed: Jun. 20, 2008

(65) Prior Publication Data

US 2008/0316971 A1    Dec. 25, 2008

Related U.S. Application Data

(60) Provisional application No. 60/945,642, filed on Jun. 22, 2007, provisional application No. 60/945,676, filed on Jun. 22, 2007, provisional application No. 60/946,164, filed on Jun. 26, 2007.

(51) Int. Cl.
*G06F 17/00* (2006.01)

(52) U.S. Cl.
USPC .......................................... 370/331; 370/228

(58) Field of Classification Search
CPC . H04W 36/18; H04W 36/38; H04W 36/0022; H04W 92/04; H04W 92/24; H04W 99/00
USPC ............................. 455/436–439; 370/331, 328
See application file for complete search history.

(56) References Cited

U.S. PATENT DOCUMENTS

| 6,741,572 | B1 | 5/2004 | Graves et al. |
| 7,672,312 | B1 * | 3/2010 | Hurtta ..................... 370/395.41 |
| 2003/0157927 | A1 | 8/2003 | Yi et al. |
| 2004/0085926 | A1 | 5/2004 | Hwang et al. |
| 2005/0026616 | A1 | 2/2005 | Cavalli et al. |
| 2007/0019600 | A1 * | 1/2007 | Zhang ........................... 370/338 |
| 2007/0025301 | A1 | 2/2007 | Petersson et al. |
| 2007/0165630 | A1 * | 7/2007 | Rasanen et al. ............... 370/389 |
| 2007/0243872 | A1 * | 10/2007 | Gallagher et al. ............ 455/436 |
| 2007/0281699 | A1 * | 12/2007 | Rasanen ....................... 455/436 |

(Continued)

FOREIGN PATENT DOCUMENTS

| JP | 2010-531118 A | 9/2010 |
| KR | 10-2007-0025964 A | 3/2007 |

(Continued)

OTHER PUBLICATIONS

"3GPP TS 23.402 v0.5.0 (May 2007) Technical Specification: Architecture Enhancements for non-3GPP Accesses. Release 8". Copyright 2006.*

(Continued)

*Primary Examiner* — Ian N Moore
*Assistant Examiner* — Thai Nguyen
(74) *Attorney, Agent, or Firm* — Condo Roccia Koptiw LLP

(57) ABSTRACT

A method and apparatus for resource management during handover operation includes initiating a handover from a first access network to a second access network. A policy update message is sent and a policy update confirmation message is received. A general packet radio service (GPRS) tunneling protocol (GTP) message and a radio access bearer (RAB) release message is sent and a GTP and RAB release acknowledgment is received. Connectivity is established for uplink and downlink transmission in the second access network.

18 Claims, 18 Drawing Sheets

(56) References Cited

U.S. PATENT DOCUMENTS

| | | |
|---|---|---|
| 2008/0130662 A1 | 6/2008 | Kotulla et al. |
| 2008/0229385 A1* | 9/2008 | Feder et al. ............... 726/1 |
| 2009/0016300 A1* | 1/2009 | Ahmavaara et al. ......... 370/331 |

FOREIGN PATENT DOCUMENTS

| | | |
|---|---|---|
| RU | 2263400 C2 | 10/2005 |
| WO | WO 2006/056184 A1 | 6/2006 |
| WO | WO 2007/001215 A1 | 1/2007 |
| WO | 2007/056042 | 5/2007 |
| WO | WO 2009/002841 A1 | 12/2008 |

OTHER PUBLICATIONS

Third Generation Partnership Project, "Technical Specification Group Services and System Aspects; General Packet Radio Service (GPRS); Service description; Stage 2 (Release 7)", 3GPP TS 23.060, V7.4.0, (Mar. 2007).

Third Generation Partnership Project, "Technical Specification Group Services and System Aspects; General Packet Radio Service (GPRS); Service description; Stage 2 (Release 7)", 3GPP TS 23.060, V7.7.0, (Jun. 2008).

Third Generation Partnership Project, "Technical Specification Group Services and System Aspects; General Packet Radio Service (GPRS); Service description; Stage 2 (Release 8)", 3GPP TS 23.060, V8.1.0, (Jun. 2008).

Third Generation Partnership Project, "Technical Specification Group Services and System Aspects; 3GPP System Architecture Evolution: Architecture Enhancements for non-3GPP accesses; Release 8", 3GPP TS 23.402, V1.1.0, (Jun. 2007).

Third Generation Partnership Project, "Technical Specification Group Services and System Aspects; 3GPP System Architecture Evolution: Architecture Enhancements for non-3GPP accesses; Release 8", 3GPP TS 23.402, V8.2.0, (Jun. 2008).

ZTE, 3GPP TSG SA WG2 Architecture—S2#SAEAdHoc, S2H060412, "Signaling flow on SAE QoS negotiation" Release 7, Apr. 2006, pp. 1-7.

3rd Generation Partnership Project (3GPP), TS 23.402 V1.0.0, "3rd Generation Partnership Project; Technical Specification Group Services and System Aspects; Architecture Enhancements for non-3GPP accesses (Release 8)", May 2007, 50 pages.

* cited by examiner

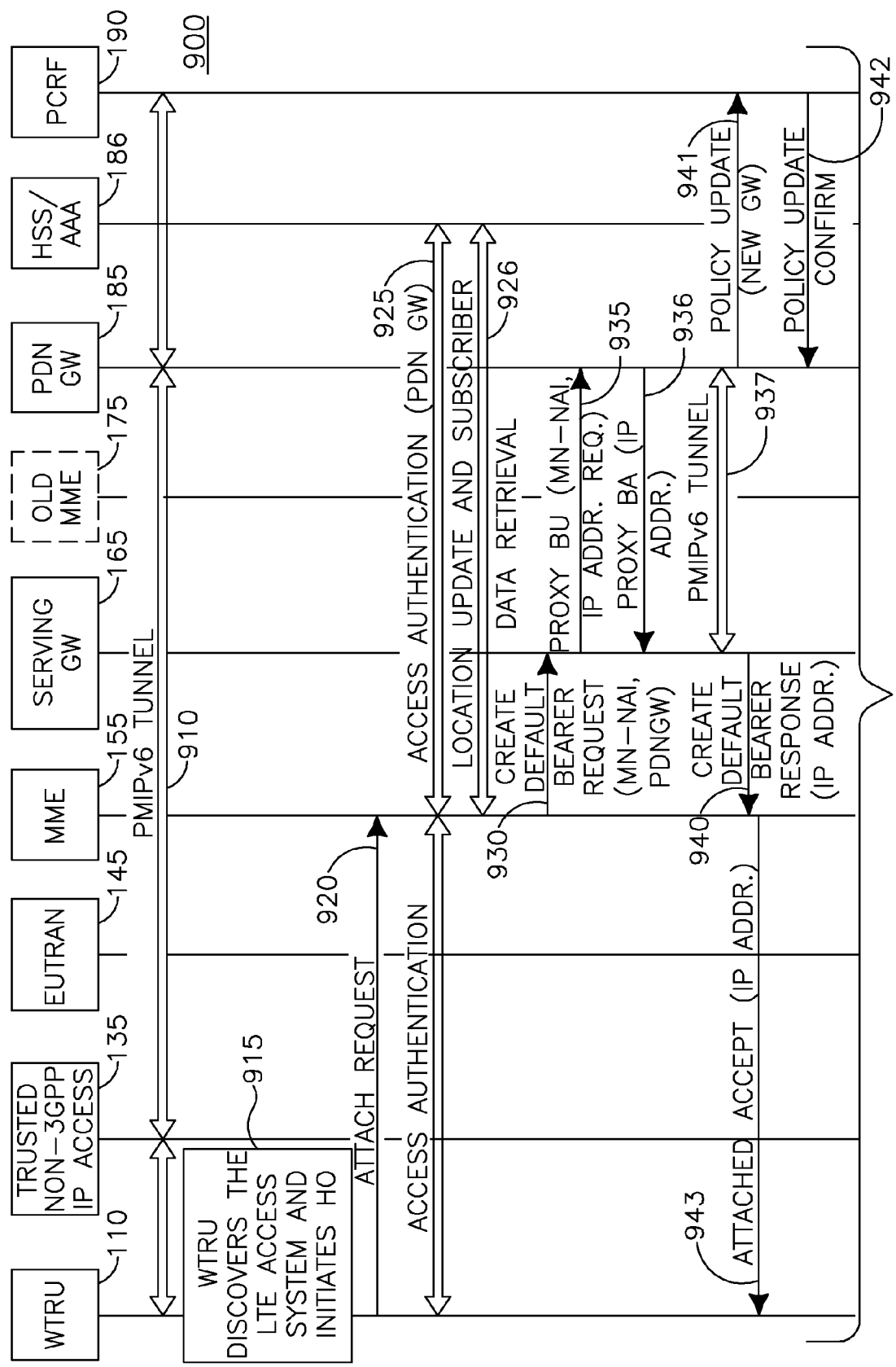
FIG.9A   SEE FIG.9B

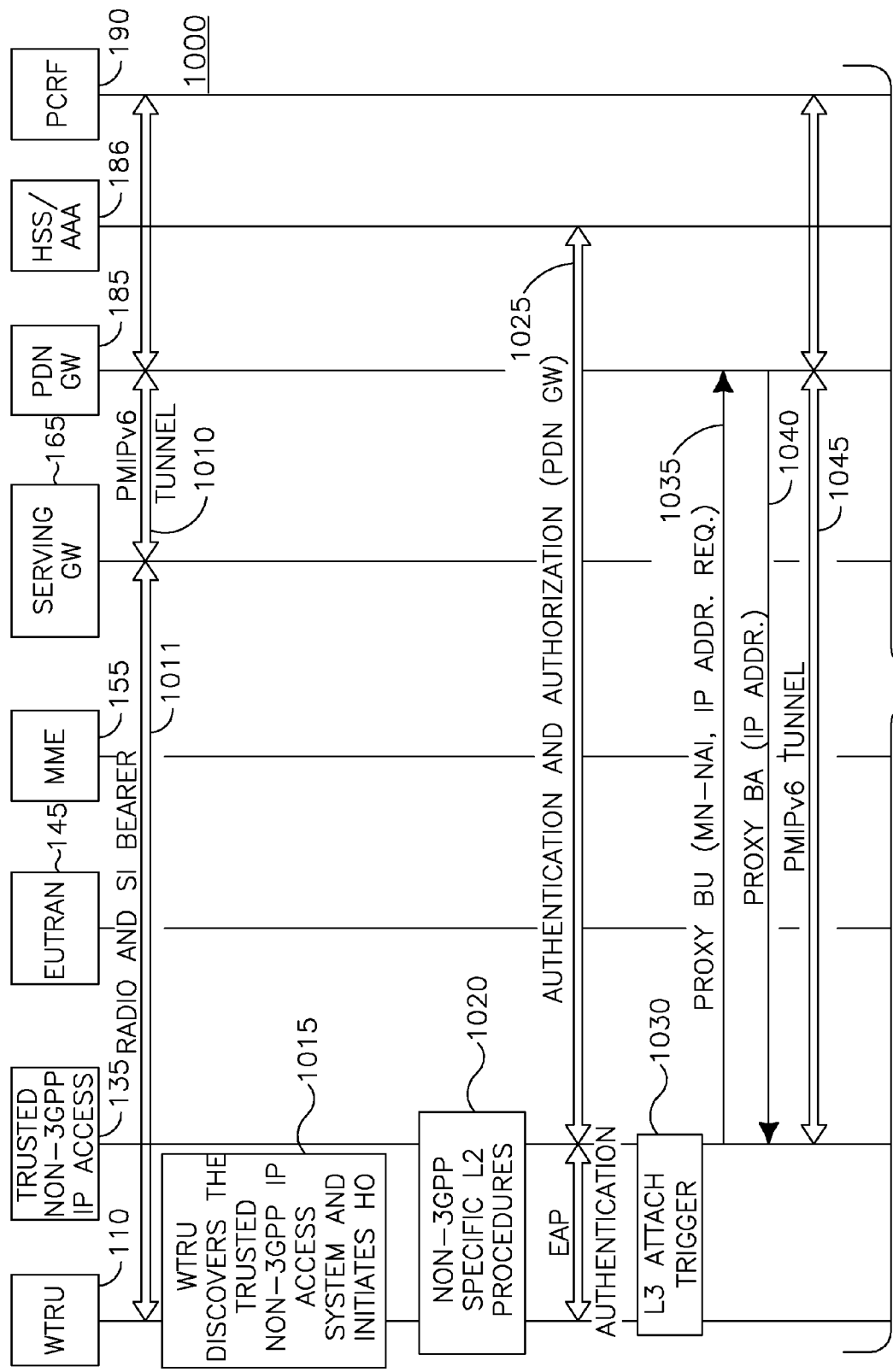

METHOD AND APPARATUS FOR RESOURCE MANAGEMENT IN HANDOVER OPERATION

CROSS REFERENCE TO RELATED APPLICATIONS

This application claims the benefit of list any U.S. Provisional Application Nos. 60/945,642, filed Jun. 22, 2007, 60/945,676, filed Jun. 22, 2007, and 60/946,164, filed Jun. 26, 2007, which are incorporated by reference as if fully set forth.

FIELD OF INVENTION

This application is related to wireless communications.

BACKGROUND

A wireless transmit/receive unit (WTRU), which in some cases may be a user equipment (UE), often undergoes handover during communication. The handover may occur from a trusted non-Third Generation Partnership Project (non-3GPP) Internet protocol (IP) access system to a 3GPP access system (evolved universal terrestrial radio access network (E-UTRAN)), and from a 3GPP access system (E-UTRAN) to a trusted non-3GPP IP access system.

In addition, the handover may occur during a roaming or non-roaming scenario. FIG. 1 shows an example network architecture 100. As defined in FIG. 1 and hereafter, the following reference points apply:

S2a: Provides the user plane with related control and mobility support between trusted non 3GPP IP access and the packet data network (PDN) Gateway (GW).

S2b: Provides the user plane with related control and mobility support between the evolved packet data gateway (ePDG) and the PDN GW.

S2c: Provides the user plane with related control and mobility support between a WTRU and the PDN GW. This reference point is implemented over trusted and/or untrusted non-3GPP Access, and/or 3GPP access.

S5: Provides user plane tunneling and tunnel management between Serving GW and PDN GW. It is used for Serving GW relocation due to mobility and in case the Serving GW needs to connect to a non-collocated PDN GW for the required PDN connectivity.

S6a: This interface is defined between mobility management entity (MME) and home subscriber server (HSS) for authentication and authorization.

S6c: The reference point between PDN GW in a home public land mobile network (HPLMN) and a 3GPP authentication, authorization and accounting (AAA) server for mobility related authentication if needed. This reference point may also be used to retrieve and request storage of mobility parameters.

S6d: The reference point between the Serving Gateway in a visited public land mobile network (VPLMN) and a 3GPP AAA Proxy for mobility related authentication if needed. This reference point may also be used to retrieve and request storage of mobility parameters.

S7: Provides transfer of quality of service (QoS) policy and charging rules from policy and charging rules function (PCRF) to policy and charging enforcement point (PCEF). The allocation of the PCEF is for further study (FFS).

S8b: The roaming interface in case of roaming with home routed traffic. It provides the user plane with related control between Gateways in the VPLMN and the HPLMN.

S9: Indicates the roaming variant of the S7 reference point for the enforcement in the VPLMN of dynamic control policies from the HPLMN.

SGi: The reference point between the PDN Gateway and the packet data network. The packet data network may be an operator external public or private packet data network or an intra operator packet data network, e.g. for provision of IP multimedia subsystem (IMS) services. This reference point corresponds to Gi and Wi functionalities and supports any 3GPP and non-3GPP access systems.

Wa*: Connects the untrusted non-3GPP IP access with the 3GPP AAA server/proxy and transports access authentication, authorization and charging-related information in a secure manner.

Ta*: Connects the trusted non-3GPP IP Access with the 3GPP AAA server/proxy and transports access authentication, authorization, mobility parameters and charging-related information in a secure manner.

Wd*: Connects the 3GPP AAA proxy, possibly via intermediate networks, to the 3GPP AAA server. Differences compared to Wd are FFS.

Wm*: This reference point is located between 3GPP AAA Server/Proxy and ePDG and is used for AAA signaling, (transport of mobility parameters, tunnel authentication and authorization data).

Wn*: This is the reference point between the untrusted Non-3GPP IP Access and the ePDG. Traffic on this interface for an initiated tunnel has to be forced towards ePDG.

Wx*: This reference point is located between 3GPP AAA Server and HSS and is used for transport of authentication data.

Usage of S6, S8 and S9 for providing a visited network with static/dynamic policies is under consideration. It is also under consideration if the two depicted S7 interfaces are different. The S1 interface for the E-UTRAN is the same for both the architectures.

FIG. 2 is a signal diagram 200 of a conventional handover from a 3GPP Access UTRAN to a trusted non-3GPP IP Access network. The handover scenario involves the S2a reference point and includes scenarios using PMIPv6 and mobile IP4 (MIP4) with foreign agent care-of-address (FA-CoA). For the FACoA mode of MIPv4, it may be considered that the S2a runs between the FA in the non-3GPP system and the PDN GW in the HPLMN. While the WTRU is connected in the 3GPP access system, PMIPv6 or general packet radio service (GPRS) tunneling protocol (GTP) is used over S5. The dual stack mobile IPv6 (DSMIPv6) protocol used over S2c is compliant to the DSMIPv6 specification over the S2a interface with PMIPv6 for a non-roaming scenario. The signaling is as follows:

1. The WTRU discovers the trusted non-3GPP IP access and decides to initiate handover from the currently used UTRAN access to the discovered trusted non-3GPP IP access system. The mechanism that aids the WTRU to discover trusted non-3GPP IP access, are specified in section on Network Discovery and Selection. At this point both uplink and downlink user data is transmitted via the following: Bearers between WTRU and source access network, GTP tunnel(s) between source 3GPP access network, Serving GW and PDN GW.

2. The initial Non-3GPP access specific L2 procedures are performed. These procedures are Non-3GPP access specific and are outside the scope of 3GPP.

3. The EAP authentication procedure is initiated and performed involving the WTRU, trusted Non-3GPP IP Access and the 3GPP AAA Server. In the roaming case, there may be several AAA proxies involved. As part of the authentication procedure, the IP address of the PDN GW that needs to be used is conveyed to PMA in the trusted Non-3GPP IP Access.

4. After successful authentication and authorization, the L3 attach procedure is triggered.

5. PMA function of trusted Non-3GPP IP Access sends Proxy Binding Update message to PDN GW.

6. The PDN GW processes the proxy binding update and creates a binding cache entry for the WTRU. The PDN GW allocates IP address for the WTRU. The PDN GW then sends a proxy binding acknowledgement to the PMA function in Trusted Non-3GPP IP Access, including the IP address(s) allocated for the WTRU. The IP address allocated is same as that was assigned to WTRU before over 3GPP access.

7. The PMIPv6 tunnel is set up between the Trusted Non-3GPP IP Access and the PDN GW.

8. L3 attach procedure is completed. IP connectivity between the WTRU and the PDN GW is set for uplink and downlink direction over the trusted non-3GPP IP access.

9. Resource clean up for the source 3GPP access is initiated by performing the necessary procedures based on the procedures specified in the 3GPP standard. PDN GW should retain the IP connectivity for the WTRU.

FIG. 3 is a signal diagram 300 of a conventional trusted non-3GPP IP access to E-UTRAN with PMIPv6 handover for a non-roaming scenario. The signaling is as follows:

1. The UE uses a trusted non-3GPP access system and is being served by PDN GW.

2. The UE discovers the E-UTRAN access system and determines to transfer its current sessions, (i.e., handover), from the currently used non-3GPP access system to the discovered E-UTRAN access system. The mechanisms that aid the UE to discover the E-UTRAN access system.

3. The UE sends an Attach Request which is routed by E-UTRAN to an MME instance in the EPS.

4. The MME contacts the HSS and authenticates the UE. As part of the authentication procedure, the IP address of the PDN GW that needs to be used is conveyed to the MME.

5. After successful authentication, the MME performs a location update procedure with the HSS.

6. The MME selects a serving GW and sends a Create Default Bearer Request (IMSI, MME Context ID) message to the selected Serving GW. It also includes the IP address of the PDN GW which was provided by the HSS.

7. Based on the Create Default Bearer Request from the MME, the Serving GW initiates the PMIPv6 registration procedure towards the PDN GW by sending a Proxy Binding Update.

8. The PDN GW responds with a Proxy Binding ACK and updates its mobility binding which effectively switches the PMIPv6 tunnel from the non-3GPP access network to the Serving GW. In the proxy Binding ACK, the PDN GW replies with the same IP address or prefix that was assigned to the UE earlier. A PMIPv6 tunnel exists now between PDN GW and Serving GW.

9. The Serving GW returns a Create Default Bearer Response message to the MME. This message also includes the IP address of the UE. This message also serves as an indication to the MME that the binding has been successful.

10. The MME sends an Attach Accept message to UE through E-UTRAN.

11. Radio-bearer and S1-U bearer is setup.

12. The UE resumes data communication over E-UTRAN.

FIG. 4 is a signal diagram 400 of a conventional E-UTRAN to trusted non-3GPP IP access with PMIPv6 handover for a non-roaming scenario. The signaling is as follows:

1. The UE uses a trusted non-3GPP access system and is being served by PDN GW.

2. The UE discovers the E-UTRAN access system and determines to transfer its current sessions (i.e. handover) from the currently used non-3GPP access system to the discovered E-UTRAN access system. The mechanisms that aid the UE to discover the E-UTRAN access system are specified in the 3GPP standards.

3. The UE sends an Attach Request which is routed by E-UTRAN to an MME instance in the EPS as specified in TS 23.401.

4. The MME contacts the HSS and authenticates the UE. As part of the authentication procedure, the IP address of the PDN GW that needs to be used is conveyed to the MME.

5. After successful authentication, the MME performs a location update procedure with the HSS.

6. The MME selects a serving GW and sends a Create Default Bearer Request (IMSI, MME Context ID) message to the selected Serving GW. It also includes the IP address of the PDN GW which was provided by the HSS.

7. Based on the Create Default Bearer Request from the MME, the Serving GW initiates the PMIPv6 registration procedure towards the PDN GW by sending a Proxy Binding Update.

8. The PDN GW responds with a Proxy Binding ACK and updates its mobility binding which effectively switches the PMIPv6 tunnel from the non-3GPP access network to the Serving GW. In the proxy Binding ACK, the PDN GW replies with the same IP address or prefix that was assigned to the UE earlier. A PMIPv6 tunnel exists now between PDN GW and Serving GW.

9. The Serving GW returns a Create Default Bearer Response message to the MME. This message also includes the IP address of the UE. This message also serves as an indication to the MME that the binding has been successful.

10. The MME sends an Attach Accept message to UE through E-UTRAN.

11. Radio-bearer and S1-U bearer is setup.

12. The UE resumes data communication over E-UTRAN.

FIG. 5 is a signal diagram 500 of a conventional procedure for implementing a handover from a trusted non-3GPP IP access system with DSMIPv6 over S2c to a 3GPP access system in a conventional non-roaming scenario. In this scenario, the session starts in a trusted non-3GPP access system, (e.g., E-UTRAN), using DSMIPv6 in a non roaming scenario. Subsequently, the session hands over to a 3GPP access system. The signaling is as follows:

1. The UE uses a trusted non-3GPP access system. It has a DSMIPv6 session with the PDN GW.

2. The UE discovers the 3GPP access system and determines to handover from the currently used trusted non-3GPP access system to the discovered 3GPP access system. The mechanisms that aid the UE discover the 3GPP access system are specified in the 3GPP standards.

3. The UE sends an Attach Request which is routed by 3GPP to an MME instance in the EPC.

4. The MME contacts the HSS/3GPP AAA and authenticates the UE. As part of the authentication procedure, the IP address of the PDN GW that needs to be used in 3GPP access is conveyed to the MME.

5. After successful authentication, the MME performs the location update procedure with HSS.

6. The MME selects a Serving GW and sends a Create Default Bearer Request (including IMSI, MME Context ID, and PDN GW IP address) message to the selected Serving GW.

7. a) For IETF based S5, the Serving GW initiates the PMIPv6 registration procedure towards the PDN GW by sending a Proxy Binding Update. If the NAI of the user is not included in step 6, the Serving GW has to derive it by other means.

b) For GTP based S5, the Serving GW sends a Create Bearer Request message to the PDN GW.

8. a) For IETF based S5, the PDN GW responds with a Proxy Binding Ack and updates its mobility binding which effectively switches the DSMIPv6 tunnel from the non-3GPP access network to the PMIPv6 tunnel to the Serving GW. In the proxy Binding Ack, the PDN GW includes the same IP address or prefix that was assigned to the UE earlier.

b) For GTP based S5, the PDN GW responds with a Create Bearer Response message to the Serving GW. The Create Bearer Response contains the same IP address or prefix that was assigned to the UE earlier.

9. The Serving GW returns a Create Default Bearer Response message to the MME. This message also includes the IP address of the UE. This message also serves as an indication to the MME that the binding has been successful.

10. The MME sends an Attach Accept message to UE through 3GPP access. The 3GPP access system initiates the radio bearer setup procedure. The 3GPP access system responds with an Attach Complete message.

11. The UE may send a BU to the PDN GW to de-register its DSMIPv6 binding that was created while the UE was in non-3GPP access system.

FIG. 6 is a signal diagram 600 of a conventional procedure for implementing a handover from a 3GPP access system to a trusted Non-3GPP IP access system with DSMIPv6 over S2c in a non-roaming scenario. In this scenario, the session starts in 3GPP access, (e.g., E-UTRAN), using PMIPv6 or GTP over S5 or no S5 is used (co-located Serving GW and PDN GW). The session hands over to the trusted non-3GPP access system that does not use PMIPv6 where the UE will receive a different prefix than the one it was using in 3GPP access system. The UE subsequently initiates DSMIPv6 with the same PDN GW to maintain the IP session. The signaling is as follows:

1. The UE uses a 3GPP access system. It has an IP address that is supported over S5 interface.

2. At this point the UE decides to initiate non-3GPP access procedure. The decision is based on any number of reasons e.g. local policies of the UE.

3. The UE performs access authentication and authorization in the non-3GPP access system. The 3GPP AAA server authenticates and authorizes the UE for access in the non-3GPP system. Note that PDN GW selection and retrieval for host based mobility is still an FFS.

4. The non-3GPP access system is not PMIPv6 capable or it decides not to use PMIPv6. Therefore, the UE gets an IP address that is different from the IP address it was using in 3GPP access system. Since the UE obtains an IP address that is not the same as the address from 3GPP system, the UE decides to initiate DSMIPv6 procedures to maintain its IP sessions.

5. The UE may discover PDN GW address using MIPv6 bootstrapping procedures.

6. The UE may also perform IKEv2 and IPSec SA establishment with the PDN GW that was discovered at step 5. This happens if RFC 4877 is used to establish SA between the UE and the PDN GW. This step may involve authentication and authorization by the 3GPP AAA system.

7. The UE sends a DSMIPv6 BU message to the PDN GW to register its CoA. The PDN GW authenticates and authorizes the UE sends back a BA including the IP address (home address) which the UE was using in the 3GPP access.

8. The UE continues with IP service using the same IP address.

It would therefore be beneficial to provide a method and apparatus that manages system resources after a successful handover.

SUMMARY

A method and apparatus for resource management during handover operation are disclosed. The method includes initiating a handover from a first access network to a second access network. A policy update message is sent and a policy update confirmation message is received. A general packet radio service (GPRS) tunneling protocol (GTP) message and a radio access bearer (RAB) release message is sent and a GTP and RAB release acknowledgment is received. Connectivity is established for uplink and downlink transmission in the second access network.

BRIEF DESCRIPTION OF THE DRAWINGS

A more detailed understanding may be had from the following description, given by way of example in conjunction with the accompanying drawings wherein:

FIGS. 9A-9B are a signal diagram of a handover from a trusted non-3GPP IP access network to an E-UTRAN with PMIPv6;

FIG. 10A-10B are a signal diagram of a handover from an E-UTRAN to trusted non-3GPP IP access network with PMIPv6;

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
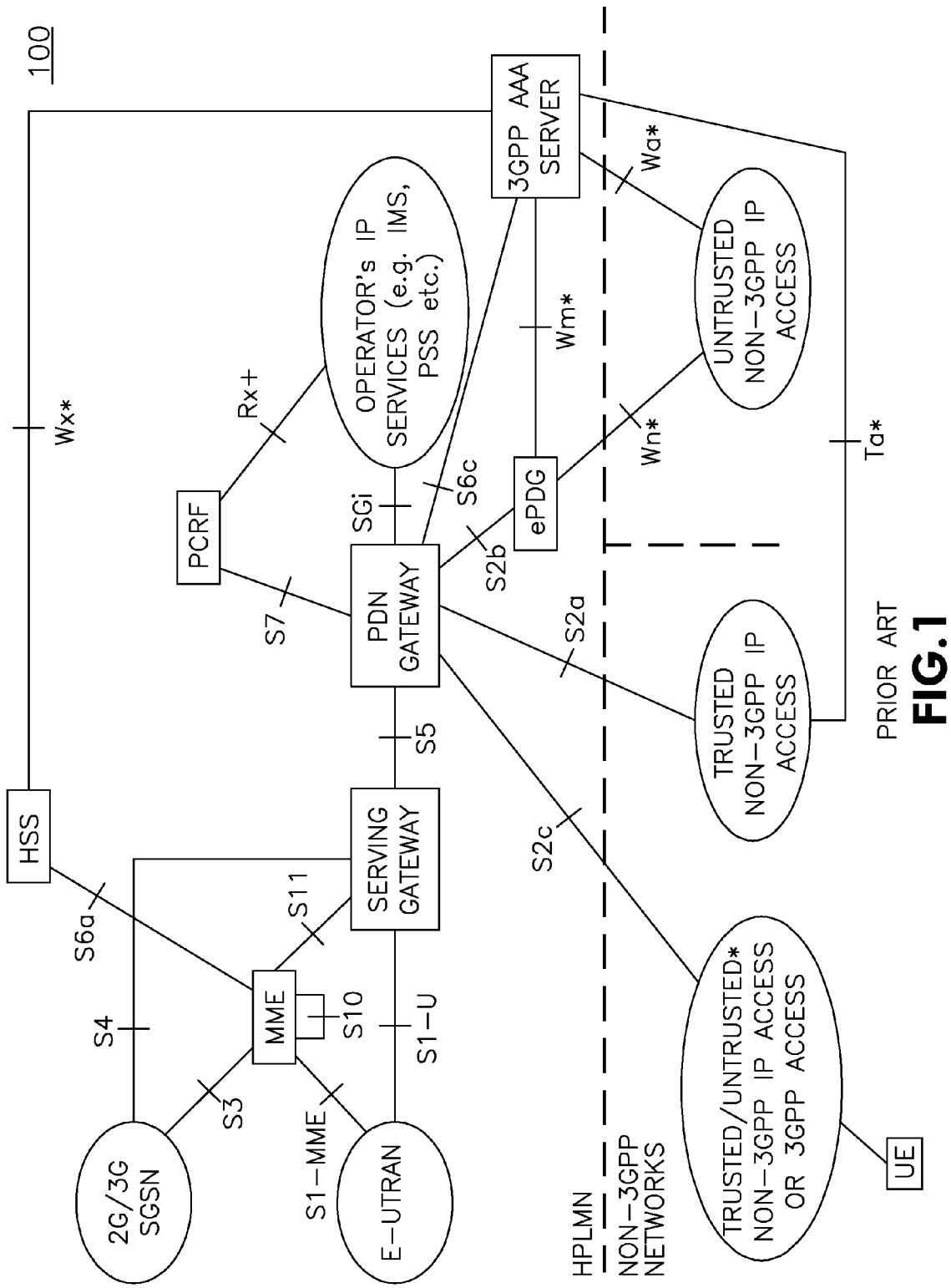
FIG. 1 shows an example network architecture.
Figure 2:
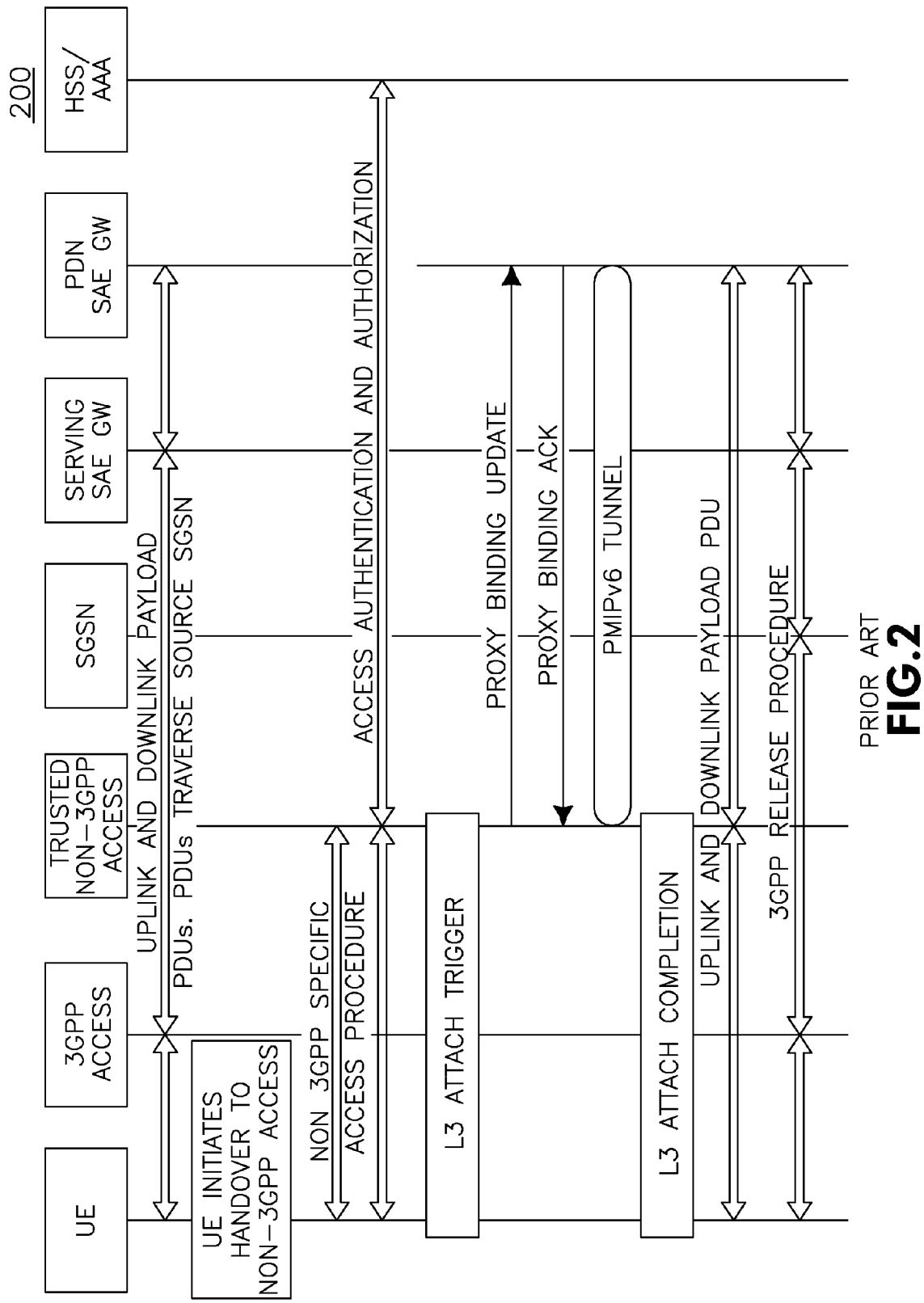
FIG. 2 is a signal diagram of a conventional handover from a 3GPP Access UTRAN to a trusted non-3GPP IP Access network.
Figure 3:
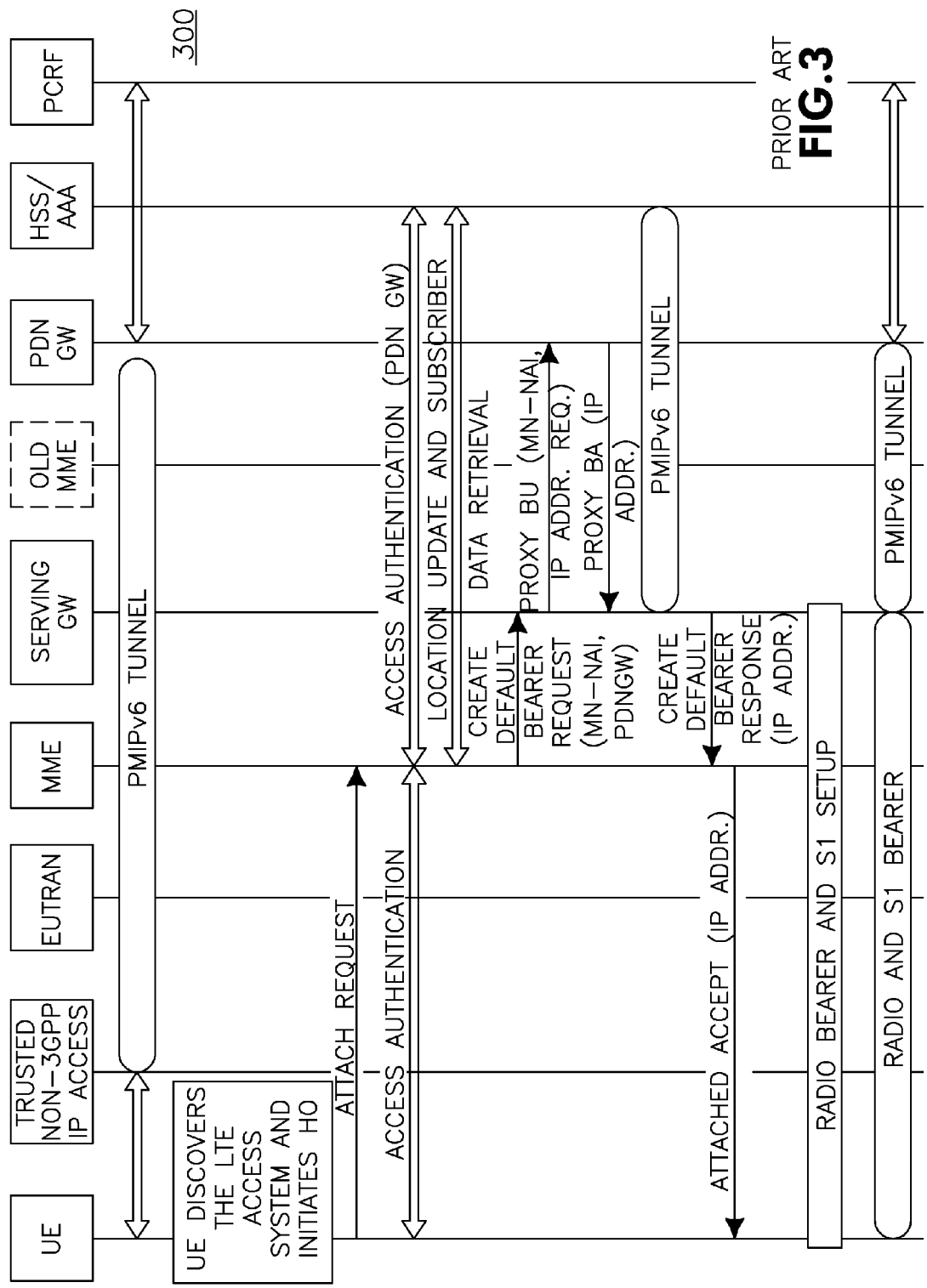
FIG. 3 is a signal diagram of a conventional trusted non-3GPP IP access to E-UTRAN with PMIPv6 handover for a non-roaming scenario.
Figure 4:
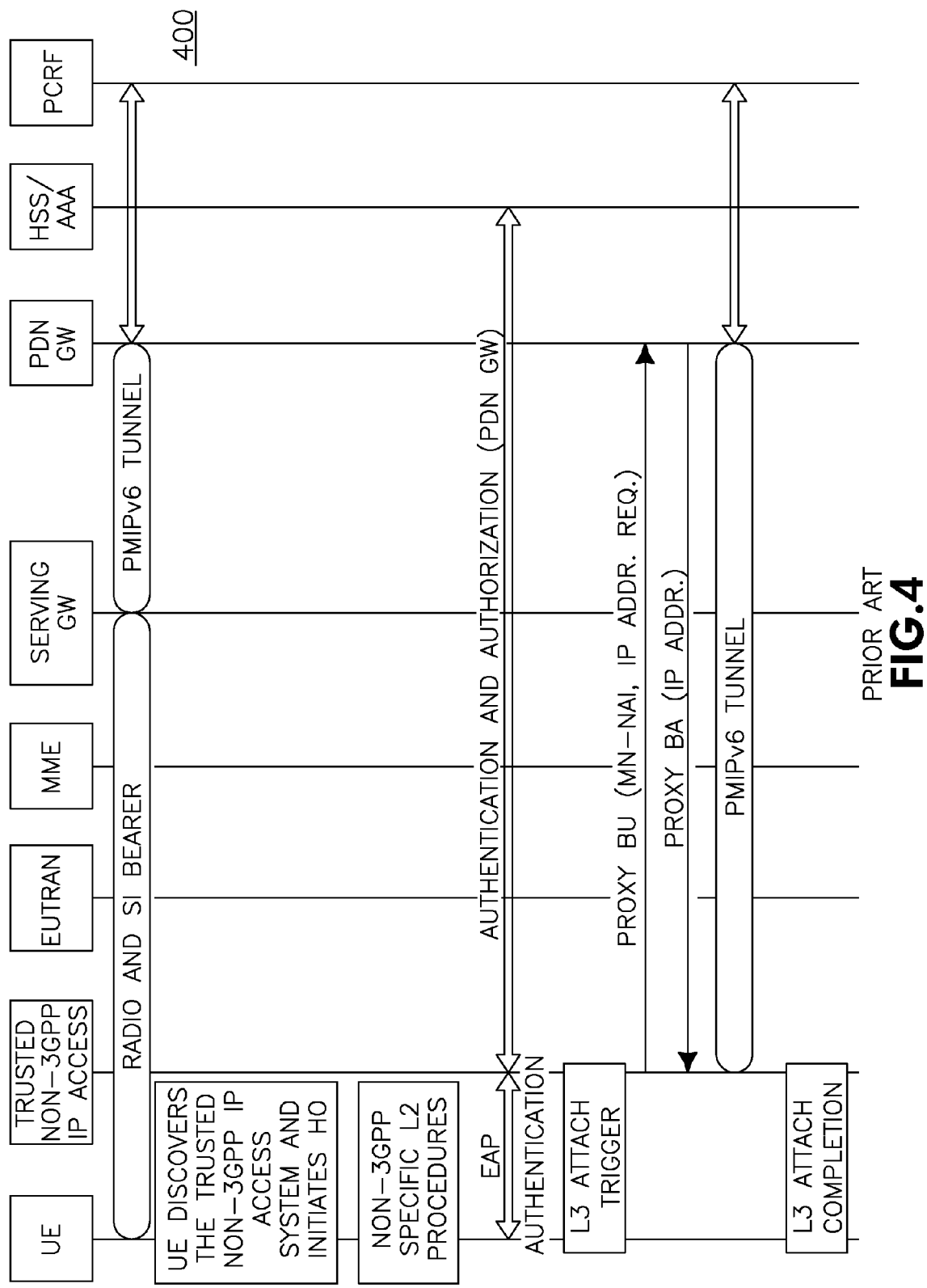
FIG. 4 is a signal diagram of a conventional E-UTRAN to trusted non-3GPP IP access with PMIPv6 handover for a non-roaming scenario.
Figure 5:
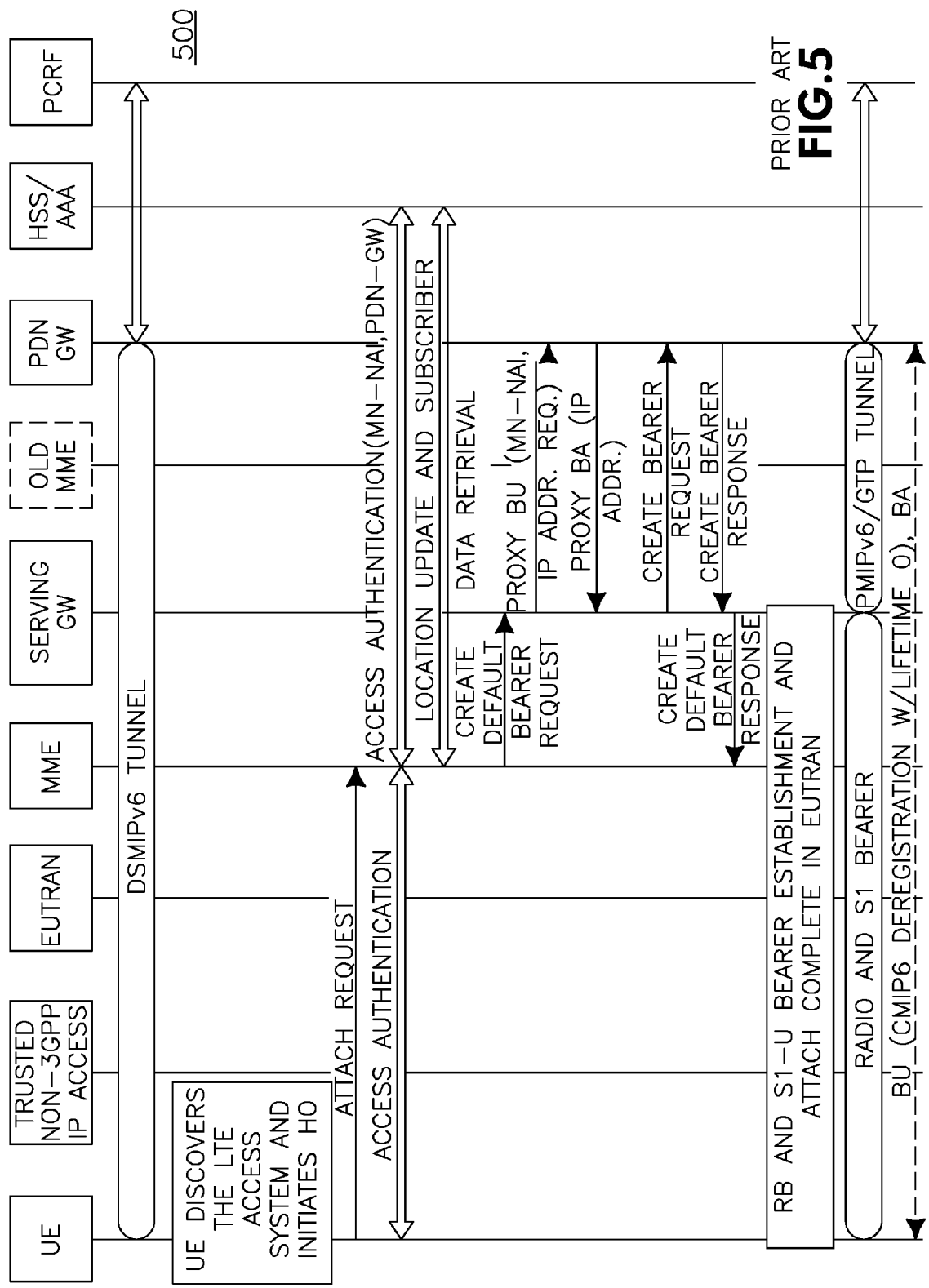
FIG. 5 is a signal diagram of a conventional procedure for implementing a handover from a trusted non-3GPP IP access system with DSMIPv6 over S2c to a 3GPP access system in a conventional non-roaming scenario.
Figure 6:
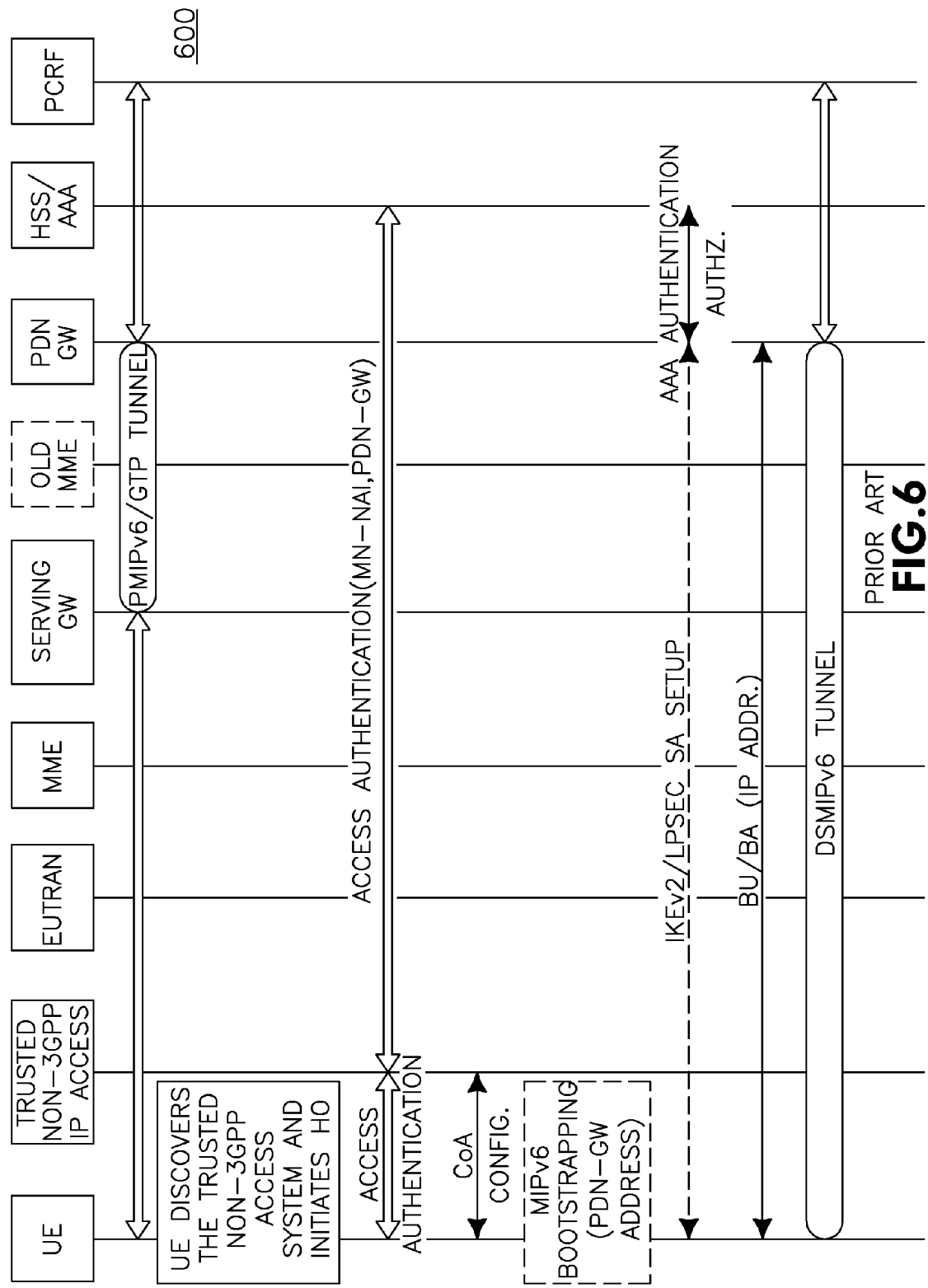
FIG. 6 is a signal diagram of a conventional procedure for implementing a handover from a 3GPP access system to a trusted Non-3GPP IP access system with DSMIPv6 over S2c in a non-roaming scenario.
Figure 7:
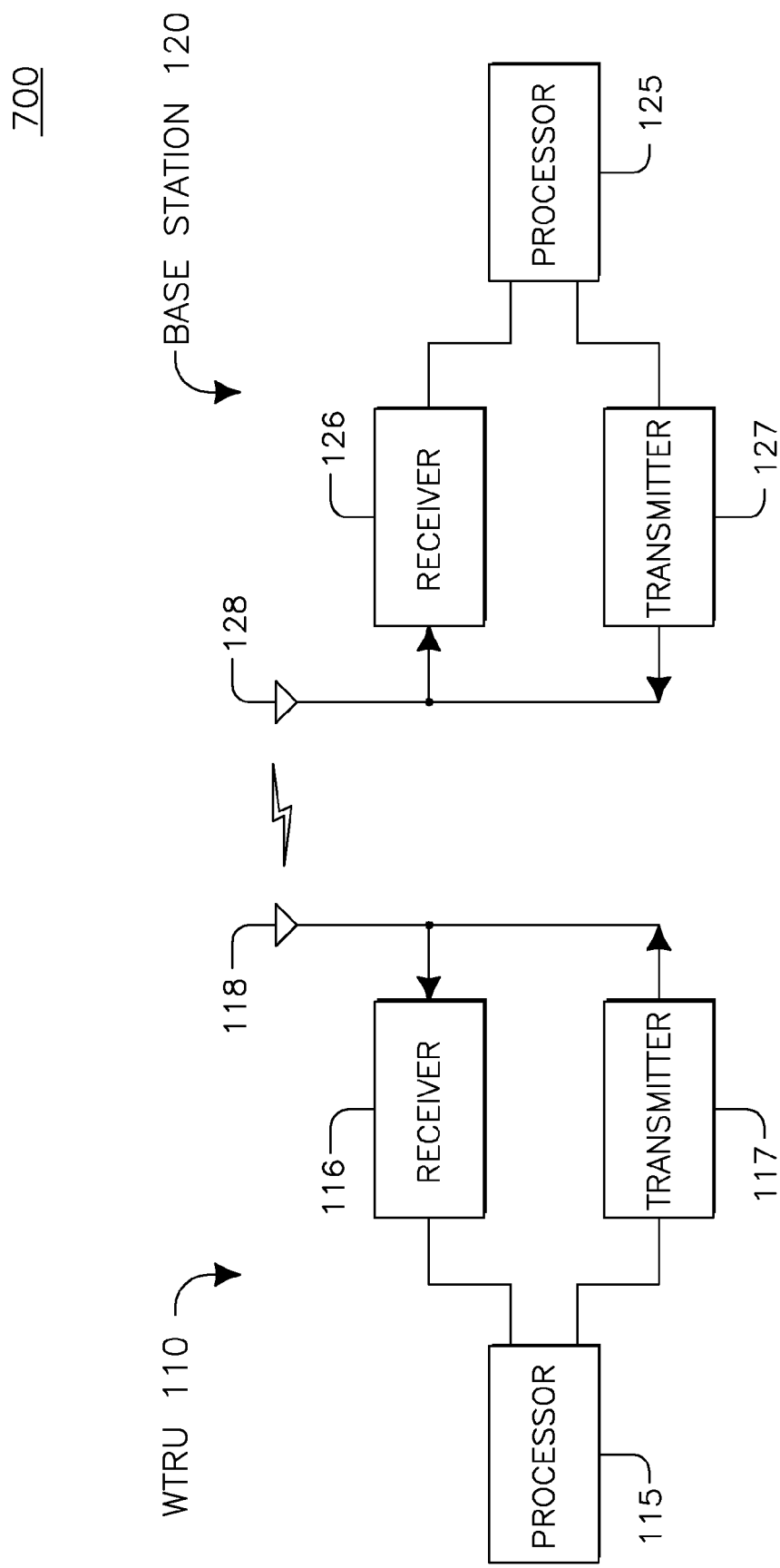
FIG. 7 is an example functional block diagram of a WTRU and a base station in wireless communication with one another.

FIG. 7 is an example functional block diagram 700 of a WTRU 110 and a base station 120. As shown in FIG. 7, the WTRU 110 is in communication with the base station 120.

In addition to the components that may be found in a typical WTRU, the WTRU 110 includes a processor 115, a receiver 116, a transmitter 117, and an antenna 118. The receiver 116 and the transmitter 117 are in communication with the processor 115. The antenna 118 is in communication with both the receiver 116 and the transmitter 117 to facilitate the transmission and reception of wireless data. The processor 115 of the WTRU 110 is configured to perform handovers.

In addition to the components that may be found in a typical base station, the base station 120 includes a processor 125, a receiver 126, a transmitter 127, and an antenna 128. The receiver 126 and the transmitter 127 are in communication with the processor 125. The antenna 128 is in communication with both the receiver 126 and the transmitter 127 to facilitate the transmission and reception of wireless data. The processor 125 of the base station is configured to perform handovers.

Figure 8A:
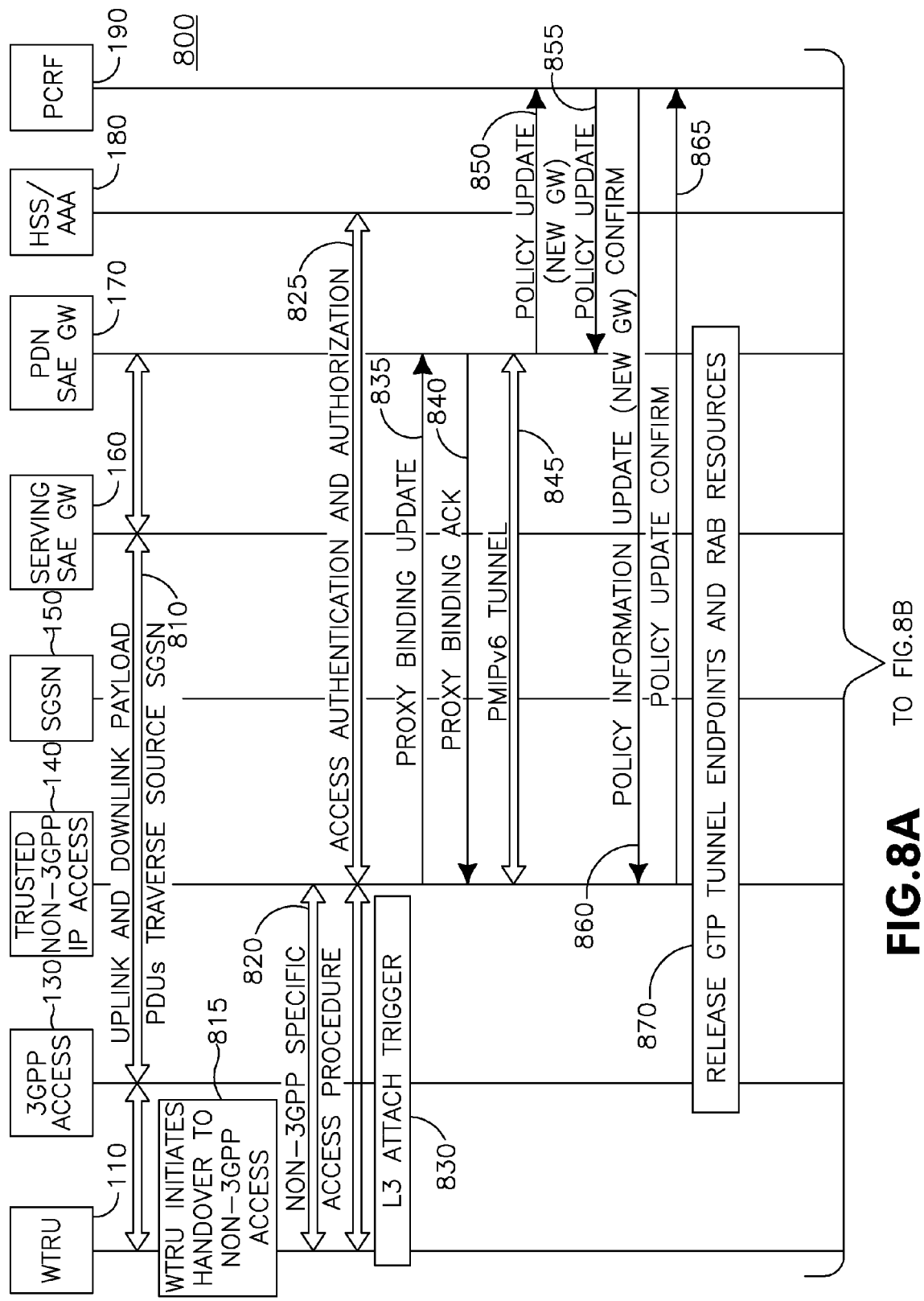
FIGS. 8A-8B are a signal diagram of a handover from a 3GPP Access (UTRAN) to trusted non-3GPP IP access network over S2a with PMIPv6.
Figure 8B:
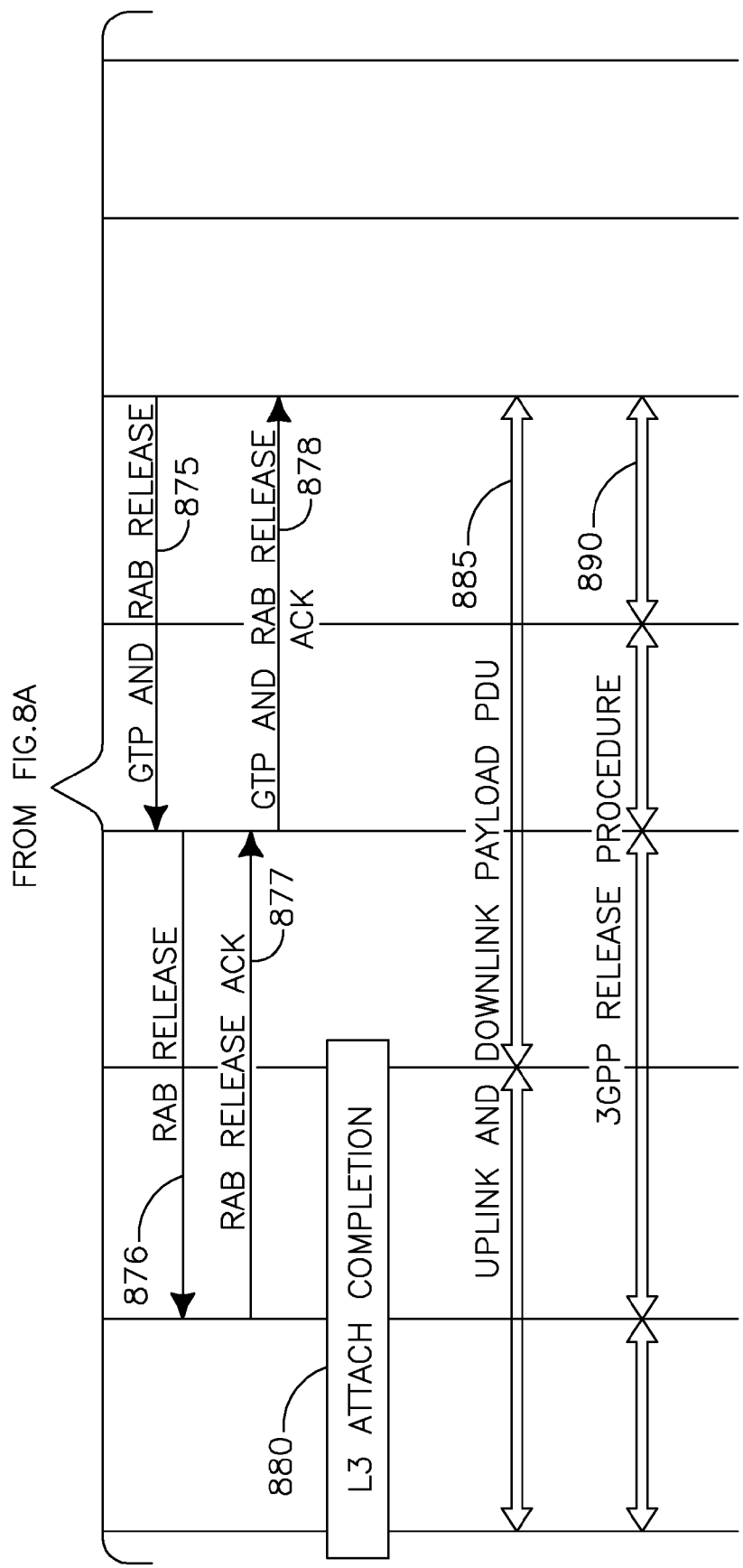

FIGS. 8A-8B are a signal diagram 800 of a handover from a 3GPP Access (EUTRAN) to trusted non-3GPP IP access network over S2a with PMIPv6. The devices communicating in the signal diagram 800 include a WTRU 110, a 3GPP access device 130, a trusted non-3GPP access network 140, an SGSN 150, a serving SAE GW 160, a PDN SAE GW 170, an HSS/AAA server 180, and a PCRF 190.

The WTRU 110 discovers the trusted non-3GPP IP access network 140 and decides to initiate handover from the currently used UTRAN access to the discovered trusted non-3GPP IP access network (815). At this point, both uplink and downlink user data is transmitted via bearers between the WTRU 110 and source access network, a GTP tunnel, or tunnels, between the source 3GPP access network 130, the serving SAE GW160 and the PDN SAE GW 170 (810).

The initial Non-3GPP access specific L2 procedures are then performed between the WTRU 110 and the trusted non-3GPP IP access network 140 (820). These procedures are Non-3GPP access specific and are outside the scope of 3GPP.

The EAP authentication and authorization procedure is initiated and performed involving the WTRU 110, trusted Non-3GPP IP Access network 140 and the 3GPP HSS/AAA server 180 (825). In a roaming situation, there may be several AAA proxies involved. As part of the authentication procedure, the IP address of the PDN SAE GW 170 to be used may be conveyed to the proxy mobile IP agent (PMA) in the trusted Non-3GPP IP Access network 140.

After successful authentication and authorization, the layer three (L3) attach procedure is triggered (830). The PMA function of the trusted Non-3GPP IP Access network sends a Proxy Binding Update message (835) to the PDN SAE GW 170, which processes the proxy binding update message and creates a binding cache entry for the WTRU 110. The PDN SAE GW 170 then allocates an IP address for the WTRU 110 and sends a proxy binding acknowledgement (ACK) message (840) to the PMA function in the trusted Non-3GPP IP Access network 140. The proxy binding ACK message (840) may include the IP address, or addresses, allocated for the WTRU 110. The IP address allocated may be the same as what was assigned to the WTRU 110 before handover from the 3GPP access network 130.

The PMIPv6 tunnel is set up between the trusted Non-3GPP IP Access network 140 and the PDN SAE GW 170 (845). A policy update message (850) is sent from the PDN SAE GW 170 to the PCRF 190, indicating the new GW. The PCRF 190 then sends a policy update confirmation message 855 to the PDN SAE GW 170. The PCRF 190 sends a policy information update message (860) to the trusted non-3GPP access network 140, which includes the new GW. The trusted non-3GPP access network 140 sends a policy update confirmation message (865) to the PCRF 190.

In step 870, GTP tunnel endpoints and radio access bearer (RAB) resources are to be released. The PDN SAE GW 170 sends a GTP and RAB release message (875) to the SGSN 150, which forwards the RAB release message (876) to the 3GPP access network 130 to release tunnel endpoints and radio resources. The 3GPP access network 130 then sends an RAB release ACK message (877) to the SGSN 150, which forwards it in the form of a GTP and RAB release ACK message (878) to the PDN SAE GW 170.

At this stage, the L3 attach procedure is completed (step 880). IP connectivity between the WTRU 110 and the PDN SAE GW 170 is set for both the uplink and downlink directions over the trusted non-3GPP IP access network 140 (885). Resource clean up for the source 3GPP access network 130 is then initiated by performing the necessary 3GPP release procedure (890). The PDN SAE GW 170 should retain the IP connectivity for the WTRU 110 at this point.

Figure 9B:
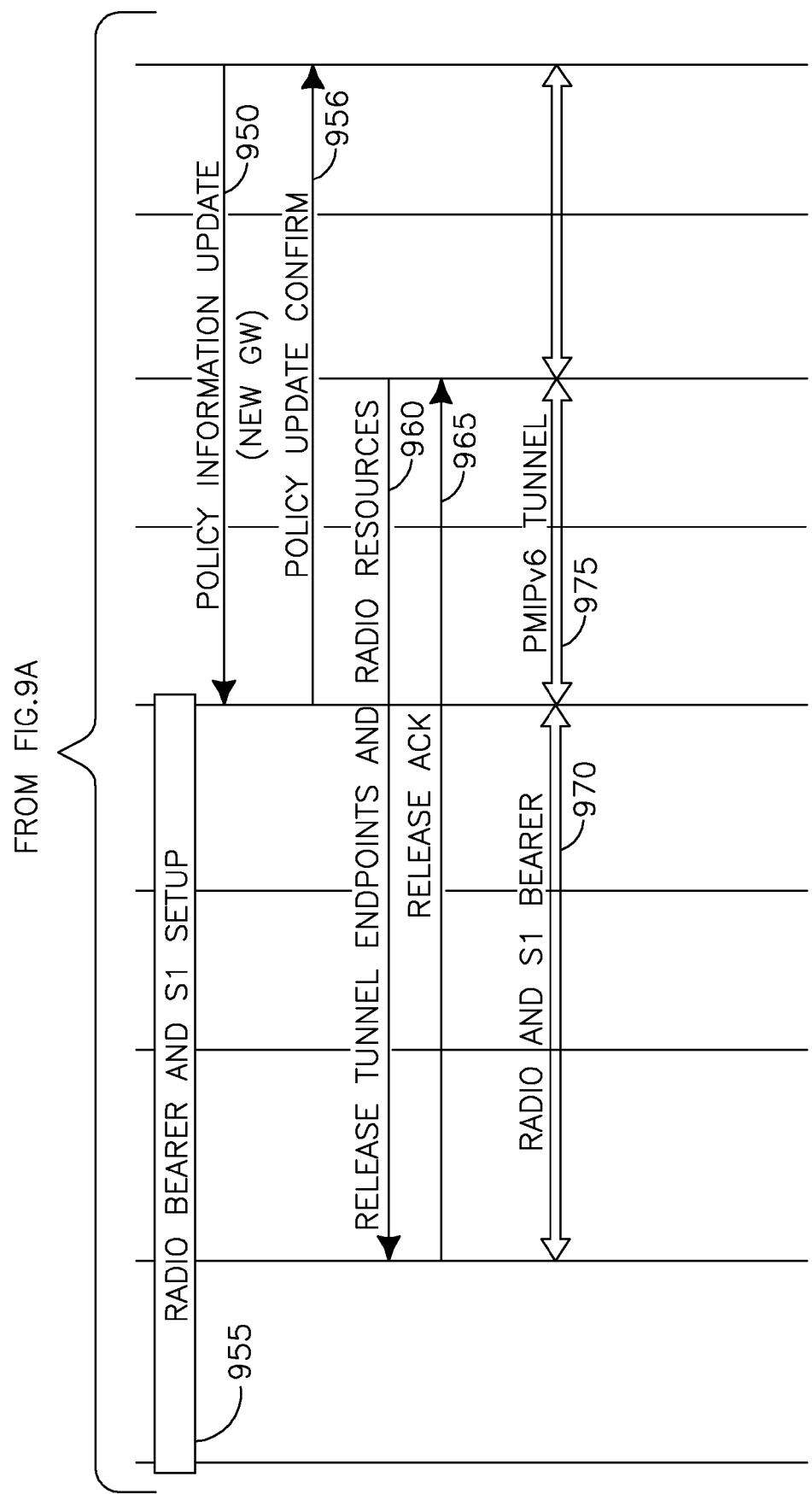

FIGS. 9A-9B are a signal diagram 900 of a handover from a trusted non-3GPP IP access network to an E-UTRAN with PMIPv6. The devices communicating in the signal diagram 900 include a WTRU 110, a trusted non-3GPP access network 135, an E-UTRAN 145, a mobility management entity (MME) 155, a serving GW 165, and old MME 175, a PDN GW 185, an HSS/AAA server 186, and a PCRF 190.

In this scenario, the WTRU 110 begins with using the trusted non-3GPP access network 135 and is being served by the PDN GW 185 over a PMIPv6 tunnel (step 910). The WTRU 110 discovers the LTE E-UTRAN access network 145 and determines to transfer its current sessions, via handover, from the currently used non-3GPP access system to the discovered E-UTRAN access network (step 915).

The WTRU 110 sends an Attach Request message (920), which is routed by the E-UTRAN access network 145 to the MME 155, which in turn contacts the HSS/AAA 186 and authenticates the WTRU 110 (step 925). As part of the authentication procedure, the IP address of the PDN GW 185 is conveyed to the MME 155. After successful authentication, the MME 155 performs a location update procedure with the HSS/AAA 186, that includes subscriber data retrieval (step 926).

The MME 155 selects a serving GW 165 and sends a Create Default Bearer Request (IMSI, MME Context ID) message (930) to the selected Serving GW 165 that includes the IP address of the PDN GW 185 was provided by the HSS/AAA 186.

Based on the Create Default Bearer Request from the MME 155, the Serving GW 165 initiates the PMIPv6 registration procedure towards the PDN GW 185 by sending a Proxy Binding Update (BU) message (935). The PDN GW 185 responds with a Proxy Binding ACK (935) and updates its mobility binding, effectively switching the PMIPv6 tunnel from the trusted non-3GPP access network 135 to the Serving GW 165. In the proxy Binding ACK message (936), the PDN GW 185 replies with the same IP address or prefix that was assigned to the WTRU 110 earlier. A PMIPv6 tunnel exists now between the PDN GW 185 and Serving GW 165.

The Serving GW 165 returns a Create Default Bearer Response message (940) to the MME 155 that includes the IP address of the WTRU 110. In addition, this message also serves as an indication to the MME 155 that the binding has been successful.

The PDN GW 185 sends a policy update message (941) to the PCRF 190 which replies by sending a policy update confirmation message (942) to the PDN GW 185.

The MME 155 sends an Attach Accept message (943) to the WTRU 110 through the E-UTRAN 145. The attach accept message (943) includes the IP address of the WTRU 110.

The PCRF 190 then sends a policy information update message (950) to the serving GW 165 with information on the new GW, and Radio-bearer and S1 bearer is setup (step 955) and the serving GW sends a policy update confirmation message (956) to the PCRF 190.

To complete the handoff, the PDN GW 185 sends a request to release the tunnel endpoints and the radio resources message (960) to the trusted non-3GPP IP access entity 135, which returns a release acknowledgement (ACK) message (965) of the release to the PDN GW 185. The radio and S1 bearer are then setup (step 970) and the PMIPv6 tunnel is established (step 975).

Figure 10B:
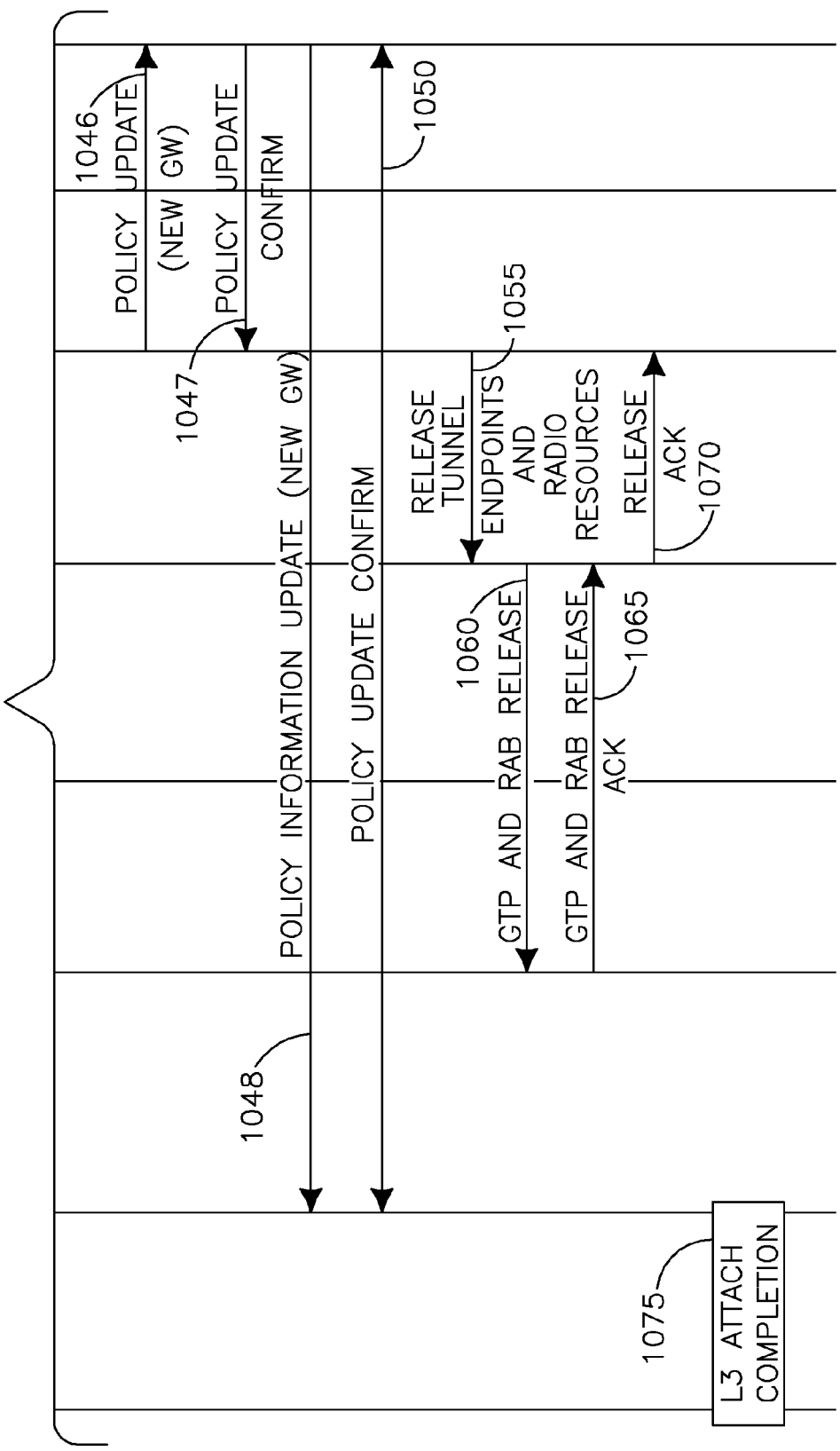

FIG. 10A-10B are a signal diagram 1000 of a handover from an E-UTRAN to trusted non-3GPP IP access network with PMIPv6. The devices communicating in the signal diagram 1000 include a WTRU 110, a trusted non-3GPP access network 135, an E-UTRAN 145, an MME 155, a serving GW 165, a PDN GW 185, an HSS/AAA server 186, and a PCRF 190. In this scenario, both uplink and downlink user data is transmitted via the following: radio and S1 Bearers between the WTRU 110 and source access network (1011), and GTP tunnel(s) between the source 3GPP access network, Serving GW 165 and PDN GW 185 (1010).

The WTRU 110 discovers the trusted non-3GPP IP access system 135 and decides to initiate handover from the currently used EUTRAN access network 145 to the discovered trusted non-3GPP IP access system 135 (step 1015). The initial Non-3GPP access specific L2 procedures are performed (step 1020).

The EAP authentication procedure is initiated and performed (step 1025), involving the WTRU 110, trusted Non-3GPP IP Access system 135 and the 3GPP HSS/AAA Server 186. In the roaming case, there may be several AAA proxies involved. As part of the authentication and authorization procedure, the IP address of the PDN GW 1025 to be used is conveyed to PMA in the trusted Non-3GPP IP Access system 135. After successful authentication and authorization, the L3 attach procedure is triggered (step 1030).

The PMA function of trusted Non-3GPP IP Access system 135 sends Proxy Binding Update message (1035) to the PDN GW 185, which processes the proxy binding update and creates a binding cache entry for the WTRU 110 and allocates and IP address for the WTRU 110. The PDN GW 185 then sends a proxy binding acknowledgement message (1040) to the PMA function in Trusted Non-3GPP IP Access system 135 that includes the IP address, or addresses, allocated for the WTRU 110. The IP address allocated is the same as that assigned to the WTRU 110 over 3GPP access.

The PMIPv6 tunnel is set up between the Trusted Non-3GPP IP Access system 135 and the PDN GW 185 (step 1045).

The PDN GW 185 sends a policy update message (1046) to the PCRF 190, which responds with a policy update confirmation message (1047). The PCRF 190 then sends a policy information update message (1048) to the trusted non-3GPP IP access entity 135 with information on the new GW. The trusted non-3GPP IP access entity sends a policy update confirmation message (1050) back to the PCRF 190.

To complete the handoff, the PDN GW 185 sends a request to release the tunnel endpoints and the radio resources message (1055) to the serving GW 165, which forwards a GPRS tunnel protocol (GTP) and radio access bearer (RAB) release request message (1060) to the MME 155 that is forwarded to the E-UTRAN 145. The E-UTRAN 145 sends a GTP and RAB release ACK message 1065 to the MME 155 which forwards the release ACK message (1070) to the PDN GW 185. At this point, the L3 attach procedure is completed (step 1075). IP connectivity between the WTRU 110 and the PDN GW 185 is set for uplink and downlink direction over the trusted non-3GPP IP access entity 135.

Figure 11A:
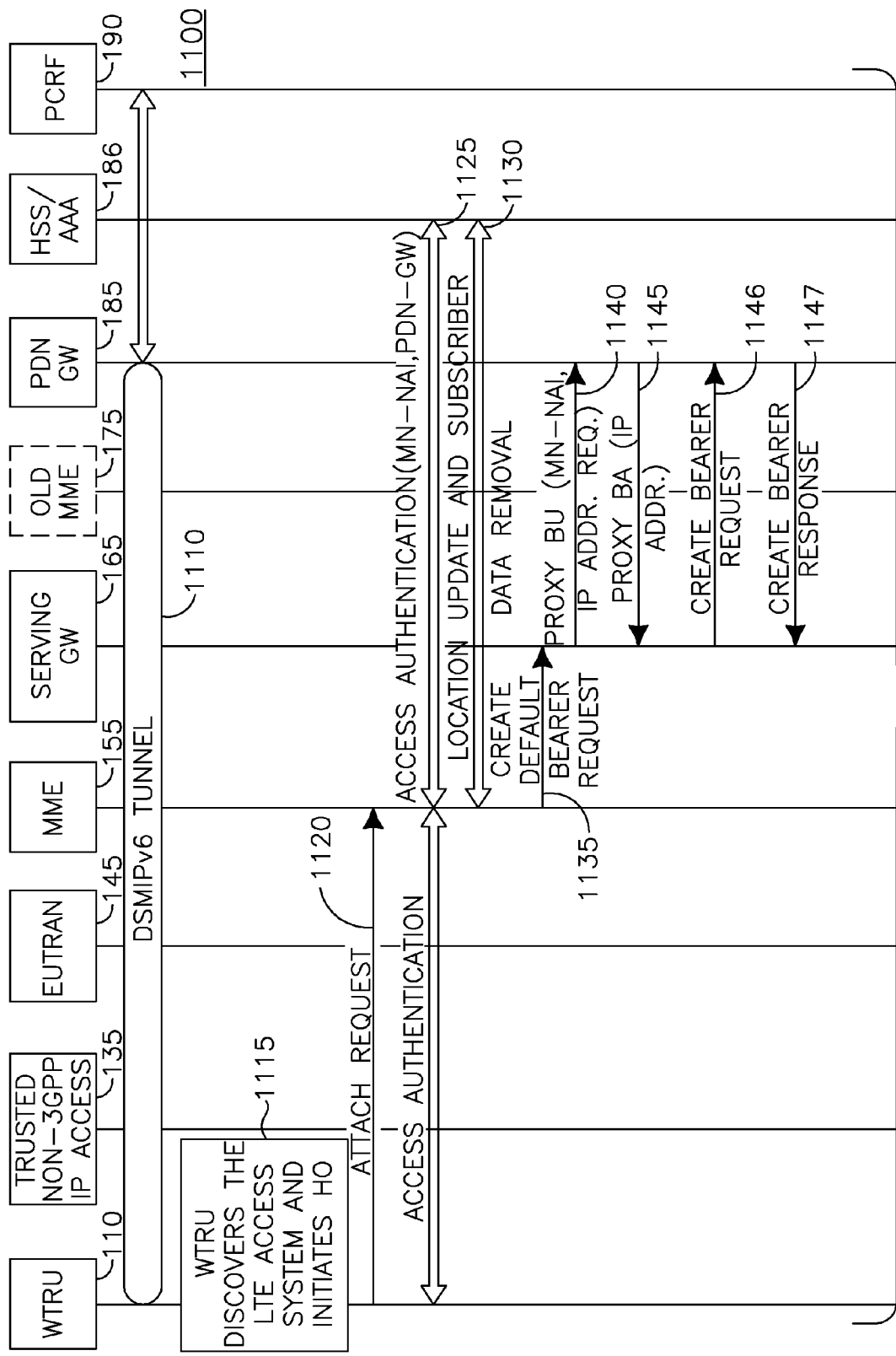
FIG. 11A-11B are a signal diagram of a handover from a trusted non-3GPP IP access network with DSMIPv6 over S2c to a 3GPP access network.
Figure 11B:
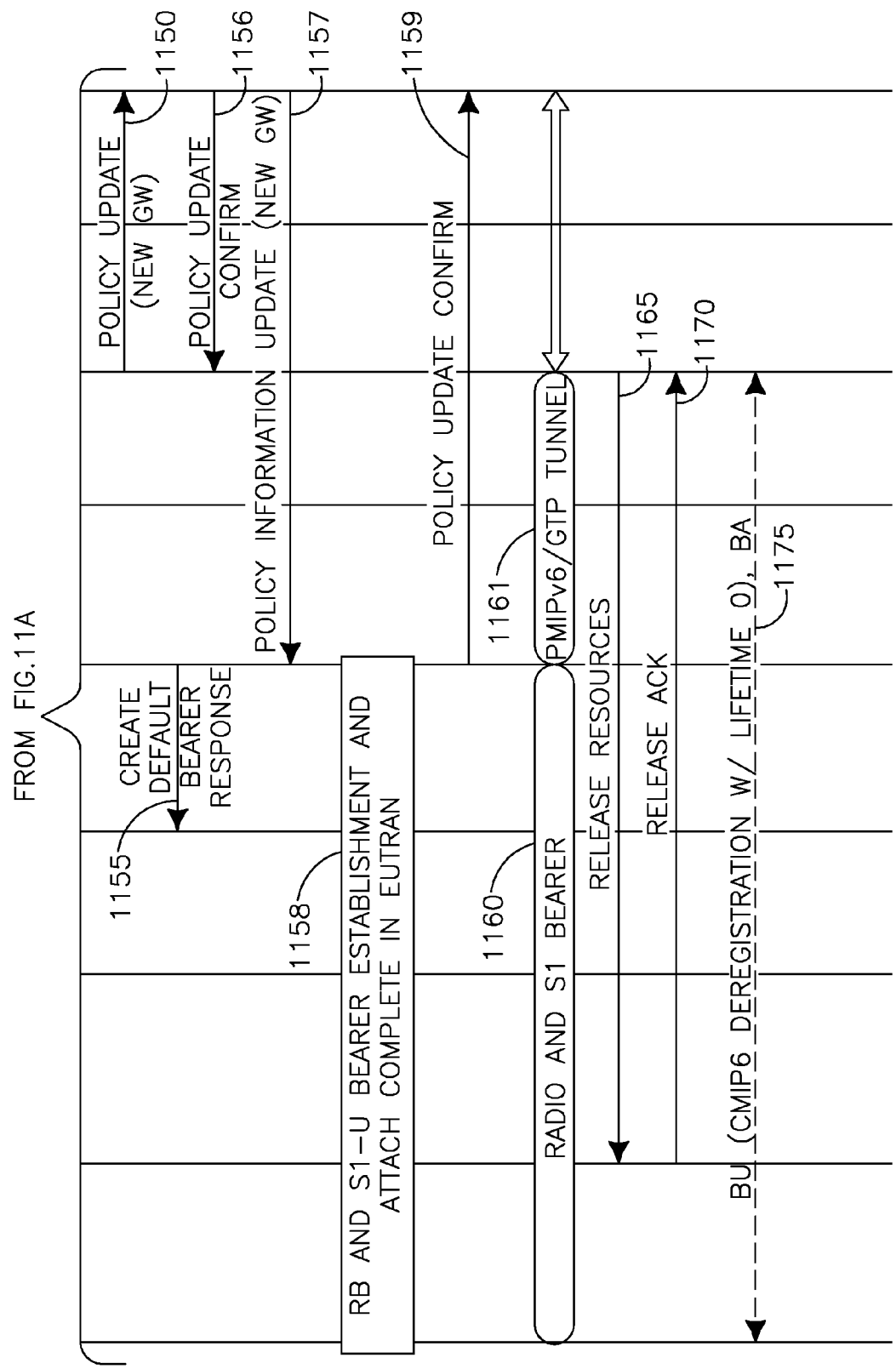

FIGS. 11A-11B are a signal diagram 1100 of a handover from a trusted non-3GPP IP access network with DSMIPv6 over S2c to a 3GPP access network. The devices communicating in the signal diagram 1100 include a WTRU 110, a trusted non-3GPP access network 135, an E-UTRAN 145, a mobility management entity (MME) 155, a serving GW 165, and old MME 175, a PDN GW 185, an HSS/AAA server 186, and a PCRF 190.

In this scenario, the session starts in a trusted non-3GPP access system, (e.g. E-UTRAN), using DSMIPv6 in a non roaming scenario via a DSMIPv6 tunnel 1110 between the WTRU 110 and the PDN GW 185.

In step 1115, the WTRU 110 discovers the 3GPP access system and determines to handover from the currently used trusted non-3GPP access system 135 to the discovered 3GPP access system. The WTRU 110 sends an Attach Request message (1120) which is routed by the 3GPP access system to the MME 155. The MME 155 contacts the HSS/AAA server 186 and authenticates the WTRU 110 (step 1125). As part of the authentication procedure, the IP address of the PDN GW 185 used in 3GPP access is conveyed to the MME 155. After successful authentication, the MME 155 performs location update procedure with the HSS/AAA server 186 (step 1130).

The MME 155 selects a Serving GW 165 and sends a Create Default Bearer Request (including IMSI, MME Context ID, and PDN GW IP address) message (1135) to the selected Serving GW 165.

For IETF based S5, the Serving GW 165 initiates the PMIPv6 registration procedure towards the PDN GW 185 by sending a Proxy Binding Update message (1140). If the NAI of the user is not included, the Serving GW 165 may derive it. The PDN GW 185 responds with a Proxy Binding ACK message (1145) and updates its mobility binding which effectively switches the DSMIPv6 tunnel from the non-3GPP access network to the PMIPv6 tunnel to the Serving GW 165. In the proxy Binding Ack message (1145), the PDN GW 185 includes the same IP address or prefix that was assigned to the WTRU 110 earlier.

For GTP based S5, the Serving GW 165 sends a Create Bearer Request message (1146) to the PDN GW 185, which responds with a Create Bearer Response message (1147) to the Serving GW 165. The Create Bearer Response message (1147) contains the same IP address or prefix that was assigned to the WTRU 110 earlier.

The Serving GW 165 returns a Create Default Bearer Response message (1155) to the MME 155. This message also includes the IP address of the WTRU 110. This message also serves as an indication to the MME 155 that the binding has been successful. A policy update message (1150) indicating a new GW is sent from the PDN GW 185 to the PCRF 190. The PCRF 190 sends a policy update confirmation message 1156 to the PDN GW 185.

The PCRF 190 the sends a policy information update message 1157 to the serving GW 165, which responds with a policy update confirmation message 1159.

In step 1158, radio bearer (RB) and S1-U bearer establishment is performed and attachment in EUTRAN is completed. This may occur with the MME 155 sending an Attach Accept message to the WTRU 110 through 3GPP access and the 3GPP access system initiating the radio bearer setup procedure. The 3GPP access system may respond with an Attach Complete message. The radio and S1 bearer are then setup up (step 1160), and a PMIPv6/GTP tunnel is established between the serving GW 165 and the PCRF 190 (step 1161).

The PDN GW 185 sends a release resources message (1165) to the trusted non-3GPP IP access system 135, and the trusted non-3GPP IP access system 135 sends a release acknowledgement message 1170 to the PDN GW 185.

At this point, the WTRU 110 may send a BU to the PDN GW 185 to de-register its DSMIPv6 binding that was created while the WTRU 110 was in the non-3GPP access system (step 1175).

Figure 12A:
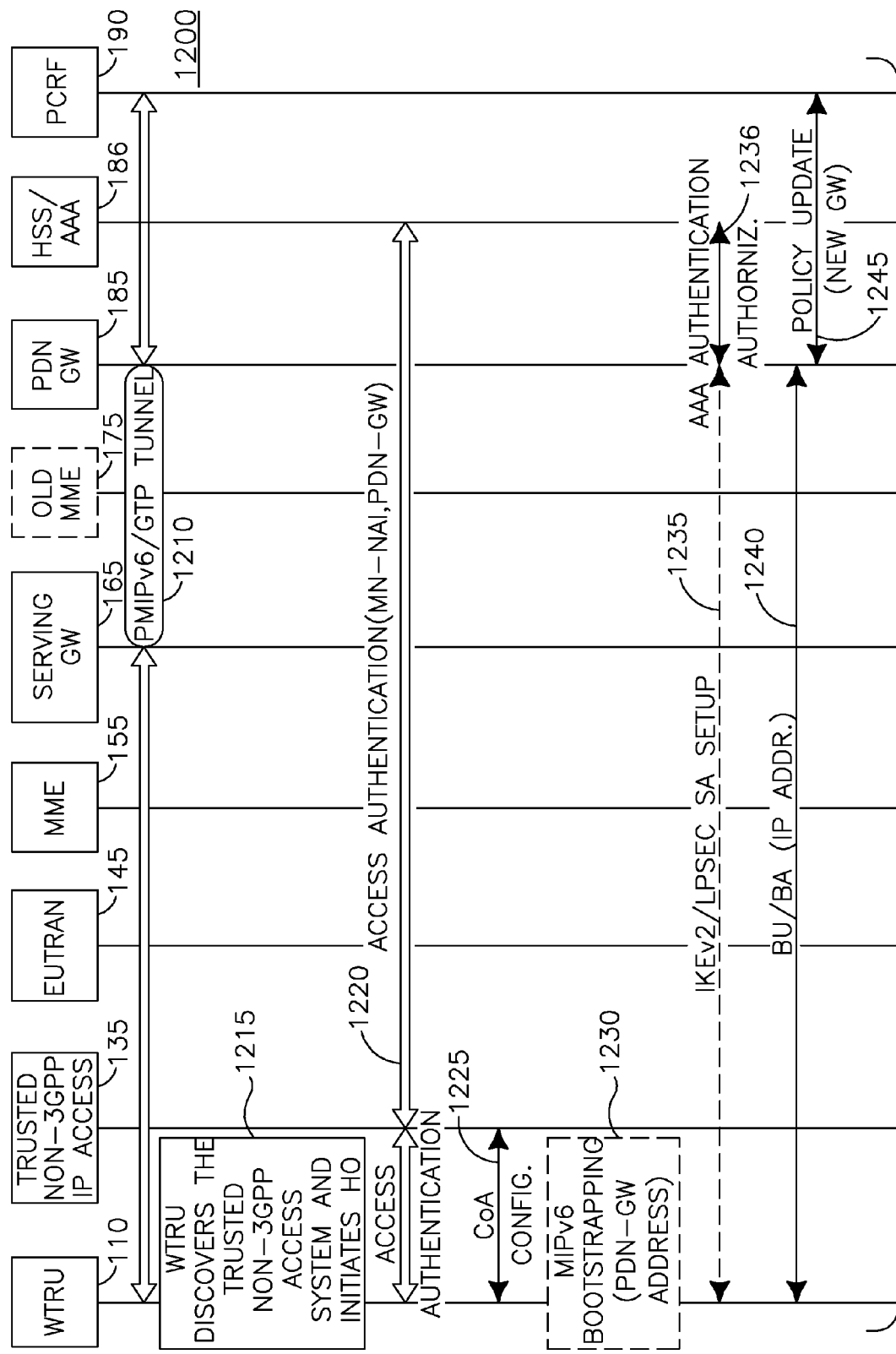
FIGS. 12A-12B are a signal diagram of a handover from a 3GPP access network to a trusted non-3GPP IP access network with DSMIPv6 over S2c.
Figure 12B:
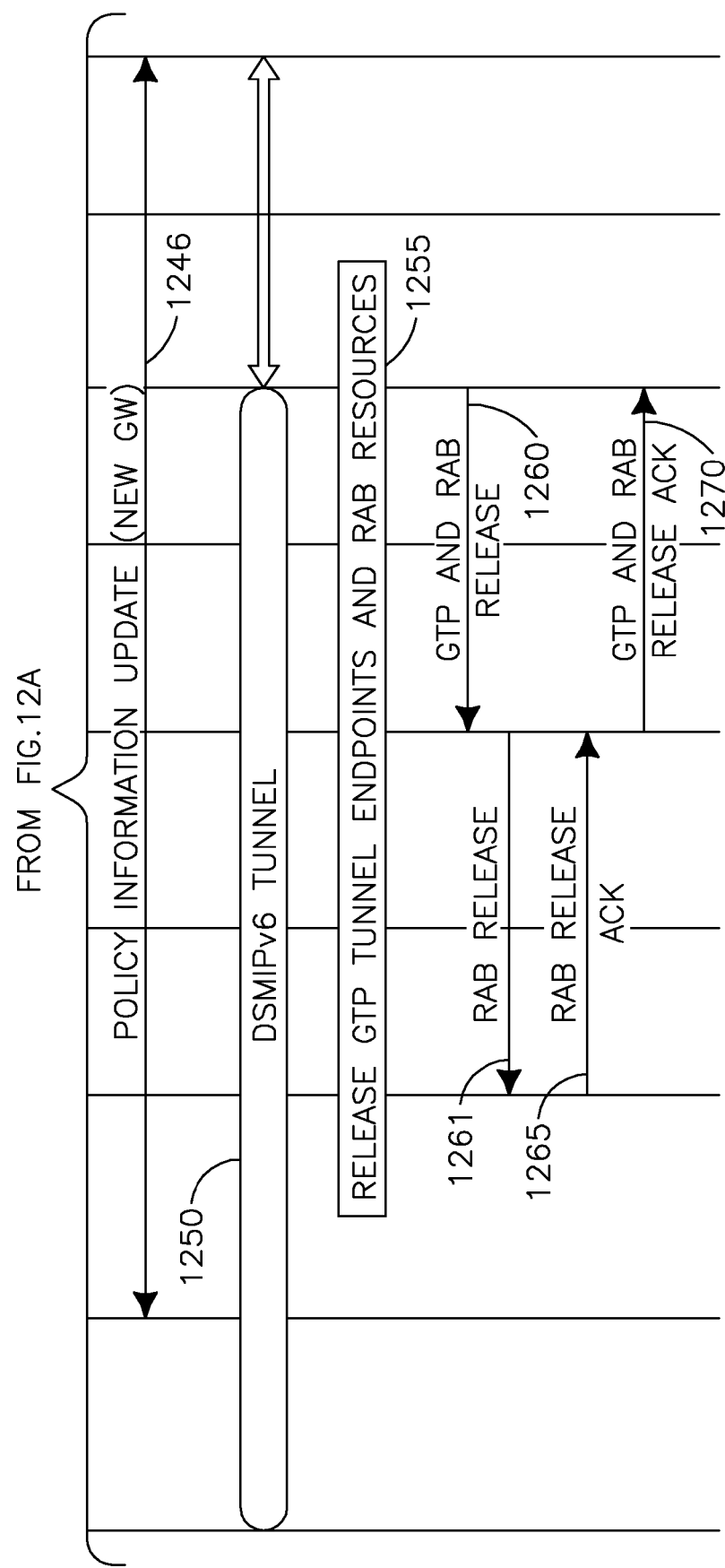

FIGS. 12A-12B are a signal diagram 1200 of a handover from a 3GPP access network to a trusted non-3GPP IP access network with DSMIPv6 over S2c. The devices communicating in the signal diagram 1100 include a WTRU 110, a trusted non-3GPP access network 135, an E-UTRAN 145, a mobility management entity (MME) 155, a serving GW 165, and old MME 175, a PDN GW 185, an HSS/AAA server 186, and a PCRF 190. In this scenario, the session starts in 3GPP access, (e.g., E-UTRAN) using PMIPv6 or GTP over S5. Alternatively, S5 is not used, such as where the serving GW 165 and the PDN GW 185 are co-located. The session hands over to the trusted non-3GPP access system 135 that does not use PMIPv6 where the WTRU 10 receives a different prefix than the one it was using in 3GPP access system. The WTRU 110 subsequently initiates DSMIPv6 with the same PDN GW 185 to maintain the IP session.

In step 1210, the WTRU 110 uses a 3GPP access system and has an IP address that is supported over the S5 interface. A PMIPv6/GTP tunnel exists between the serving GW 165 and the PDN GW 185.

The WTRU 110 discovers the trusted non-3GPP access system 135 and initiates the non-3GPP access procedure (step 1215). The decision may be based on a number of reasons, such as the local policies of the WTRU 110.

In step 1220, the WTRU 110 performs access authentication and authorization in the non-3GPP access system. The 3GPP HSS/AAA server 186 authenticates and authorizes the WTRU 110 for access in the non-3GPP system.

A CoA configuration (step 1225) occurs between the WTRU 110 and the trusted non-3GPP IP access system 135. The non-3GPP IP access system 135 may not be PMIPv6 capable or it may not use PMIPv6. Therefore, the WTRU 110 may receive an IP address that is different from the IP address it was using in 3GPP access system. Since the WTRU 110 obtains an IP address that is not the same as the address from the 3GPP system, the WTRU 110 may initiate DSMIPv6 procedures to maintain its IP sessions.

In step 1230, the WTRU 110 may discover the PDN GW 185 address using MIPv6 bootstrapping procedures. Additionally, the WTRU 110 may also perform IKEv2 and IPSec SA establishment with the PDN GW (step 1235). This happens if RFC 4877 is used to establish SA with between the WTRU 110 and the PDN GW 185. This may also involve authentication and authorization by the 3GPP HSS/AAA system 186 (step 1236).

The WTRU 110 then sends a DSMIPv6 BU message (1240) to the PDN GW 185 to register its CoA. The PDN GW 185 authenticates and authorizes the WTRU 110 sends back a BA including the IP address, or home address, which the WTRU 110 was using in the 3GPP access system. A policy update message (1245) indicating a new GW is sent from the PDN GW 185 to the PCRF 190, which responds with a policy update confirmation message to the PDN GW 185.

The PCRF 190 then sends a policy information update message (1246) to the trusted non-3GPP IP access system 135. The trusted non-3GPP IP access system 135 sends a policy update confirmation message to the PCRF 190.

A DSMIPv6 tunnel is established (step 1250), and GTP tunnel endpoints and RAB resources are released (step 1255). This may be accomplished by the PDN GW 185 sending a release GTP tunnel endpoints and RAB resources message 1260 to the serving GW 165, which in turn forwards the RAB release message 1261 to the E-UTRAN 145. The E-UTRAN 145 sends an RAB release acknowledgement message 1265 to the serving GW 165, which forwards a GTP and RAB release ACK message 1270 to the PDN GW 185. At this point, the WTRU 110 may continue with IP service using the same IP address.

Figure 13:
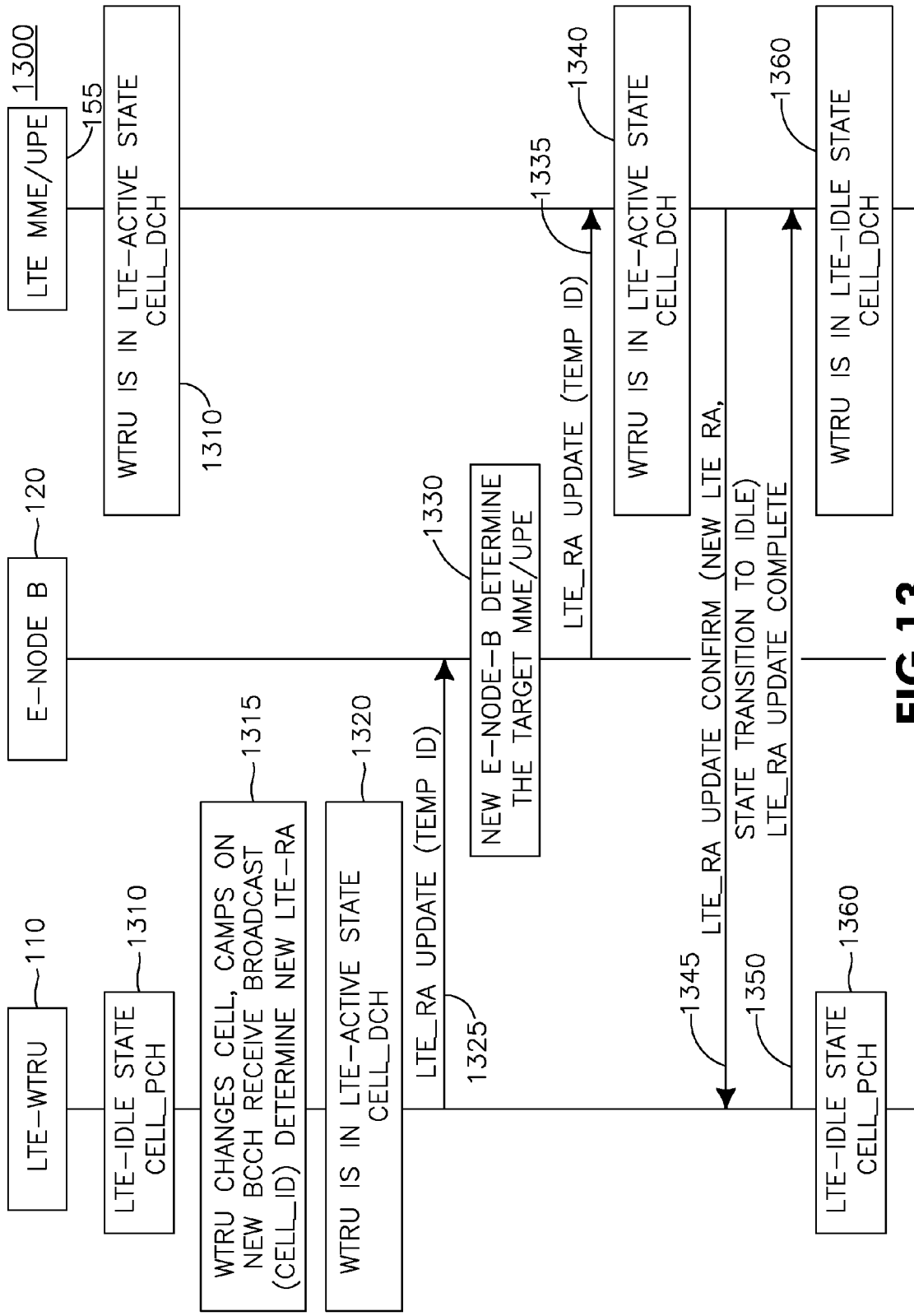
FIG. 13 is a signal diagram of an LTE_RA update procedure.

FIG. 13 is a signal diagram 1300 of an LTE_RA update procedure. The devices communicating in FIG. 13 are an LTE WTRU 110, an eNode-B 120, and an LTE MME/UPE 155.

The moving LTE WTRU 110 is in an LTE_IDLE state (CELL_PCH) in step 1310. The LTE WTRU 110 enters a new LTE-RA, (i.e., changes its cell), camps on a new BCCH and receives the system information broadcast (CELL_ID) to determine the new LTE_RA the cell belongs to (step 1315).

In step 1340, the LTE WTRU 110 is in the LTE-active state (CELL_DCH) and performs LTE_RA update procedures by sending an LTE_RA update message (1325) containing the temporary identity of the LTE WTRU 110. The new eNode-B 120 determines the target MME/UPE 155 (step 1330) and routes the LTE_RA update message (1335) to the correct MME/UPE 155. In step 1340, the LTE MME/UPE 155 recognizes that the LTE WTRU 110 is in the LTE-active state (CELL_DCH) and sends an LTE_RA update confirmation message 1345, which assigns the LTE WTRU 110 to a new LTE_RA and orders it back to the LTE_IDLE state.

The LTE WTRU 110 sends an LTE_RA update complete message (1350) to the LTE MME/UPE 155. The LTE WTRU 110 then re-enters the LTE-IDLE state (CELL_PCH) (step 1360). A reduction of network attachments may occur as a result of the multi-to-multi relationship between the eNode-B 120 and the LTE MME/UPE 155.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for resource management using a packet data network gateway (PDN GW) during a handover operation from a first access network to a second access network, the method comprising:
   sending a policy update message from the PDN GW to a policy and charging rules function (PCRF) over an interface comprising at least one of the following: an S2a interface, an S2c interface and an S5 interface;
   receiving, at the PDN GW, a policy update confirmation message from the PCRF over the interface;
   establishing, via the PDN GW, connectivity between user equipment (UE) and the PDN GW for uplink and downlink transmission over the second access network; and
   releasing, via the PDN GW, resources associated with the first access network; wherein the first access network comprises either a third generation partnership project (3GPP) access network or a trusted non-3GPP Internet Protocol (IP) access network, and the second access network comprises either a third generation partnership project (3GPP) access network or a trusted non-3GPP Internet Protocol (IP) access network.

2. The method of claim 1 wherein the policy update message includes information relating to a gateway (GW) in the second access network.

3. The method of claim 1 wherein the first access network is a third generation partnership project (3GPP) access network and the second access network is a trusted non-3GPP Internet protocol (IP) access network.

4. The method of claim 1 wherein the first access network is a trusted non-third generation partnership project (3GPP) Internet protocol (IP) access network and the second access network is a long term evolution (LTE) evolved universal terrestrial radio access network (E-UTRAN).

5. The method of claim 1 wherein the connectivity comprises IP connectivity.

6. The method of claim 1 further comprising establishing a PMIPv6 tunnel between the PDN GW and the second network.

7. The method of claim 1 further comprising:
   sending a general packet radio service (GPRS) tunneling protocol (GTP) and radio access bearer (RAB) release message; and
   receiving a GTP and RAB release acknowledgment (ACK).

8. A base station, comprising:
   a receiver;
   a transmitter; and
   a processor in communication with the receiver and the transmitter, the processor configured to send a policy update message from a packet data network gateway (PDN GW) to a policy and charging rules function (PCRF) over an interface comprising at least one of the following: an S2a interface, an S2c interface, and an S5 interface, receive a policy update confirmation message from the PCRF over the interface, establish connectivity between user equipment (UE) and the base station for uplink and downlink transmission over a second access network; and release resources associated with a first access network; wherein the first access network comprises either a third generation partnership project (3GPP) access network or a trusted non-3GPP Internet Protocol (IP) access network, and the second access network comprises either a third generation partnership project (3GPP) access network or a trusted non-3GPP Internet Protocol (IP) access network.

9. The base station of claim 8 wherein the policy update message includes information relating to a gateway (GW) in the second access network.

10. The base station of claim 8 wherein the first access network is a third generation partnership project (3GPP) access network and the second access network is a trusted non-3GPP Internet protocol (IP) access network.

11. The base station of claim 8 wherein the first access network is a trusted non-third generation partnership project (3GPP) Internet protocol (IP) access network and the second access network is a long term evolution (LTE) evolved universal terrestrial radio access network (E-UTRAN).

12. The base station of claim 8 wherein the connectivity comprises IP connectivity.

13. The base station of claim 8 wherein at least one of the following: the receiver, the transmitter, and the processor is further configured to establish PMIPv6 tunnel between the PDN GW and the second access network.

14. The base station of claim 8 wherein at least one of the following: the receiver, the transmitter, and the processor is further configured to:
   send a general packet radio service (GPRS) tunneling protocol (GTP) and radio access bearer (RAB) release message; and
   receive a GTP and RAB release acknowledgment (ACK).

15. A method for resource management using a packet data network gateway (PDN GW) during a handover operation from a third generation partnership project (3GPP) access network to a trusted non-3GPP Internet protocol (IP) access network, the method comprising:
   sending a policy update message from the PDN GW to a policy and charging rules function (PCRF) over an S5 interface;
   receiving, at the PDN GW, a policy update confirmation message from the PCRF over the S5 interface;
   establishing, via the PDN GW, IP connectivity between user equipment (UE) and the PDN GW for uplink and downlink transmission over the trusted non-3GPP IP access network; and
   releasing, via the PDN GW, resources associated with the 3GPP access network.

16. The method of claim 15 further comprising establishing a PMIPv6 tunnel between the PDN GW and the trusted non-3GPP IP access network.

17. The method of claim 15 further comprising:
sending a general packet radio service (GPRS) tunneling protocol (GTP) and radio access bearer (RAB) release message; and
receiving a GTP and RAB release acknowledgment (ACK).

18. The method of claim 15 wherein the policy update message includes information relating to a gateway (GW) in the trusted non-3GPP IP access network.

\* \* \* \* \*